(12) United States Patent
Harazono et al.

(10) Patent No.: US 9,120,527 B2
(45) Date of Patent: Sep. 1, 2015

(54) STEERING DAMPER CONTROL APPARATUS, AND A SADDLE RIDING TYPE VEHICLE HAVING THE SAME

(75) Inventors: Yasunobu Harazono, Shizuoka (JP); Masashi Matsuo, Shizuoka (JP); Nobuo Hara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 64 days.

(21) Appl. No.: 14/116,189

(22) PCT Filed: May 9, 2012

(86) PCT No.: PCT/JP2012/003034
§ 371 (c)(1),
(2), (4) Date: Nov. 7, 2013

(87) PCT Pub. No.: WO2012/153526
PCT Pub. Date: Nov. 15, 2012

(65) Prior Publication Data
US 2014/0058627 A1    Feb. 27, 2014

(30) Foreign Application Priority Data
May 10, 2011  (JP) .................................. 2011-105114

(51) Int. Cl.
*B62K 21/08*    (2006.01)

(52) U.S. Cl.
CPC ........... *B62K 21/08* (2013.01); *F16F 2224/045* (2013.01); *F16F 2230/18* (2013.01)

(58) Field of Classification Search
CPC ........... F16F 9/535; F16F 7/082; F16F 9/537; F16F 7/09; F16F 9/145; F16F 15/03; F16F 9/125; F16F 2222/06; F16F 9/3292; F16F 2230/08; F16F 9/38; B62K 25/18; B62K 5/027; B62K 5/10; B60G 17/08; B60G 2400/252; B60G 2500/10; B60G 2400/102; B60G 2600/184; B60G 17/018; B60G 2400/204
USPC ........ 701/37, 38, 51, 82, 90, 54, 83; 180/197, 180/219, 220, 230, 443
See application file for complete search history.

(56) References Cited

U.S. PATENT DOCUMENTS 6,637,558 B2 * 10/2003 Oliver et al. ................ 188/267.2
6,742,794 B2 *  6/2004 Bunya et al. .................. 280/272
(Continued)

FOREIGN PATENT DOCUMENTS

EP      1 930 233 A2    6/2008
JP      2001-301682 A  10/2001
(Continued)

OTHER PUBLICATIONS

Official Communication issued in corresponding European Patent Application No. 12781796.3, mailed on Apr. 24, 2014.
(Continued)

*Primary Examiner* — John R Olszewski
*Assistant Examiner* — Truc M Do
(74) *Attorney, Agent, or Firm* — Keating & Bennett, LLP

(57) ABSTRACT

In a steering damper control apparatus, when a command value output unit detects an idle spin of a rear wheel, a damper driver increases a damping force of an MR damper to be higher than a damping force thereof used when the rear wheel is not spinning idly. Therefore, skidding of the rear wheel is prevented to prevent a posture change of a motorcycle. As a result, a driving direction of the rear wheel deviating from a traveling direction is prevented to efficiently use the drive of the rear wheel during traveling.

16 Claims, 14 Drawing Sheets

(56) References Cited

U.S. PATENT DOCUMENTS

| | | | |
|---|---|---|---|
| 7,044,489 B2 * | 5/2006 | Bunya et al. | 280/272 |
| 7,306,248 B2 * | 12/2007 | Gogo et al. | 280/272 |
| 7,775,333 B2 * | 8/2010 | Or et al. | 188/267.2 |
| 7,958,979 B2 * | 6/2011 | Sekiya et al. | 188/267.2 |
| 8,056,918 B2 * | 11/2011 | Miyashiro et al. | 280/272 |
| 2002/0152832 A1 | 10/2002 | Hasegawa et al. | |
| 2002/0157909 A1 | 10/2002 | Hasegawa et al. | |
| 2005/0173911 A1 * | 8/2005 | Takeuchi et al. | 280/771 |
| 2006/0207845 A1 * | 9/2006 | Gogo et al. | 188/290 |
| 2007/0032913 A1 * | 2/2007 | Ghoneim et al. | 701/1 |
| 2007/0216124 A1 * | 9/2007 | Wakabayashi et al. | 280/89 |
| 2007/0273202 A1 * | 11/2007 | Ogawa | 303/113.2 |
| 2008/0105479 A1 * | 5/2008 | Nishiike et al. | 180/197 |
| 2008/0167784 A1 * | 7/2008 | Fujita et al. | 701/71 |
| 2008/0183353 A1 * | 7/2008 | Post et al. | 701/42 |
| 2009/0043452 A1 * | 2/2009 | Sekiya | 701/40 |
| 2009/0062994 A1 * | 3/2009 | Nedachi et al. | 701/51 |
| 2009/0199815 A1 * | 8/2009 | Fukami et al. | 123/399 |
| 2009/0302557 A1 | 12/2009 | Hara et al. | |
| 2009/0326769 A1 * | 12/2009 | Oshima et al. | 701/51 |
| 2010/0017077 A1 * | 1/2010 | Oshima et al. | 701/51 |
| 2011/0036656 A1 * | 2/2011 | Nicoson | 180/220 |
| 2011/0160977 A1 * | 6/2011 | Matsuda | 701/85 |
| 2012/0022750 A1 * | 1/2012 | Matsuda | 701/51 |
| 2012/0022761 A1 * | 1/2012 | Matsuda | 701/87 |
| 2012/0065825 A1 * | 3/2012 | Nicoson | 701/22 |
| 2012/0253626 A1 * | 10/2012 | Yamaguchi | 701/85 |

FOREIGN PATENT DOCUMENTS

| | | |
|---|---|---|
| JP | 2001-334982 A | 12/2001 |
| JP | 2002-302085 A | 10/2002 |
| JP | 2003-040179 A | 2/2003 |
| JP | 2005-219617 A | 8/2005 |
| JP | 2005-349927 A | 12/2005 |
| JP | 2009-126432 A | 6/2009 |
| JP | 2009-292258 A | 12/2009 |
| JP | 2010-228621 A | 10/2010 |

OTHER PUBLICATIONS

Official Communication issued in International Patent Application No. PCT/JP2012/003034, mailed on Aug. 14, 2012.

* cited by examiner

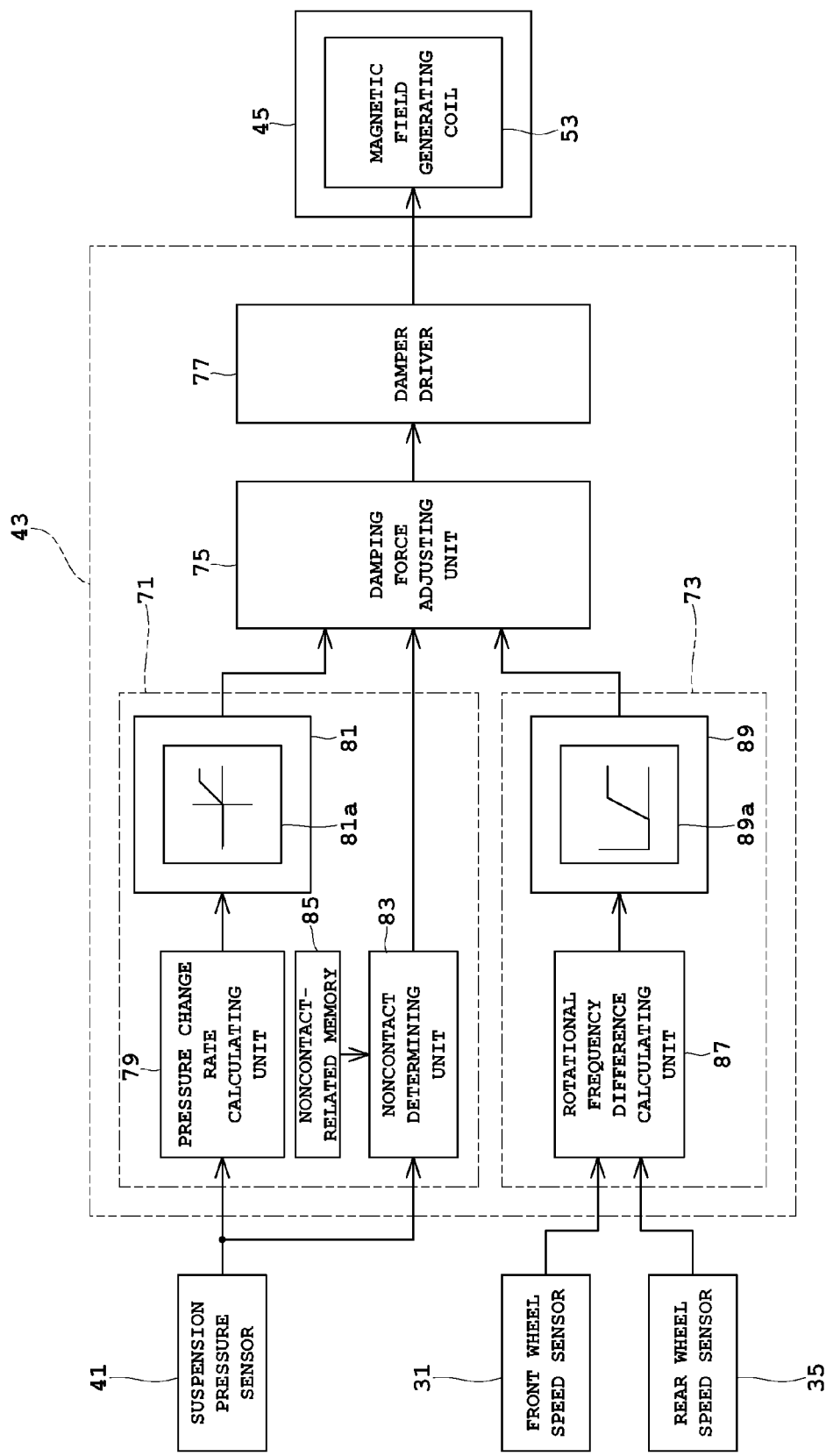

STEERING DAMPER CONTROL APPARATUS, AND A SADDLE RIDING TYPE VEHICLE HAVING THE SAME

BACKGROUND OF THE INVENTION

1. Field of the Invention

The present invention relates to a steering damper control apparatus that controls a damping force of a steering damper provided in a steering mechanism of a vehicle to adjust a steering damping force, and to a saddle riding type vehicle including the same.

2. Description of the Related Art

Recently, saddle riding type vehicles including a steering damper control apparatus to adjust a damping force of a steering mechanism in order to stabilize posture changes and to ease the riders' burden have been increasing in popularity. Such steering damper control apparatus include the following.

A first apparatus of this type has a steering mechanism, a steering damper, an adjusting mechanism, a rear stroke sensor, and a control device (see Japanese Unexamined Patent Publication No. 2009-126432, for example). The steering mechanism is pivotably supported by a vehicle body. The steering damper applies a damping force to the torque of the steering mechanism. The adjusting mechanism adjusts the damping force of the steering damper. The rear stroke sensor detects an amount of stroke of a rear suspension. Based on outputs of the rear stroke sensor, the control device, when the vehicle is slowing down, controls the adjusting mechanism to increase the damping force of the steering damper compared with a time of steady traveling.

This first apparatus, when the vehicle is determined to be slowing down based on the outputs of the rear stroke sensor, increases the damping force of the steering damper. This can prevent kickbacks produced against the rider's intention by the steering mechanism undergoing disturbance of the traveling surface, for example. As a result, posture changes of the vehicle can be prevented even when the vehicle is slowing down.

A second apparatus of this type includes a steering damper which adjusts a damping force according to an amount of operation of the accelerator. When an opening degree of the accelerator is small, the vehicle is determined to be traveling at low speed, and the damping force is kept low. When the opening degree of the accelerator is large, the vehicle is determined to be traveling at high speed, and the damping force is increased (see Japanese Unexamined Patent Publication No. 2001-301682, for example).

This second apparatus determines a traveling state based on the amount of operation of the accelerator, thus preventing the steering from becoming unstable which would easily produce a situation where the front wheel is subject to levitation. As a result of this determination, posture changes of the vehicle can be prevented during acceleration.

A third apparatus of this type includes an acceleration detector and a control device (see Japanese Unexamined Patent Publication No. 2002-302085, for example). The acceleration detector detects acceleration of the vehicle body. Only when the acceleration exceeds a threshold value, the control device causes a steering damper to generate a damping force.

Although a load of the front wheel will decrease to produce a kickback easily when acceleration reaches or exceeds the threshold value, this third apparatus can increase the damping force of the steering damper to prevent a kickback. As a result, posture changes of the vehicle can be prevented during acceleration.

However, the above conventional examples with such constructions have the following problems.

When the rear wheel spins idly, the rear wheel may sway sideways relative to the front wheel, thus changing the posture of the vehicle to a large extent. This tends to occur when a coefficient of friction of the traveling surface is low, and during cornering on a rough surface such as those used by off-road vehicles, for example, in which case the drive of the rear wheel will greatly deviate from the traveling direction. When such a posture change occurs, the drive of the rear wheel will be unavailing to the traveling, and will become a very serious loss especially in race running or the like.

The first conventional apparatus noted above determines deceleration based on an amount of stroke of the rear suspension, and increases the damping force of the steering damper. However, since in the situation described above, there occurs also a situation in which the stroke of the rear suspension shortens, it cannot cope with the above situation.

The second apparatus determines acceleration based on the accelerator opening degree, and increases the damping force of the steering damper. However, since in the above situation the accelerator opening degree may be small, it may be unable to cope with the above situation also.

The third apparatus increases the damping force of the steering damper based on the acceleration of the acceleration detector having exceeded the threshold value. However, since acceleration can be close to zero in the above situation, it may be unable to cope.

SUMMARY OF THE INVENTION

Preferred embodiments of the present invention have been made in regard to the state of the art noted above, and provide a steering damper control apparatus and a saddle riding type vehicle including the same, which efficiently use the drive of a rear wheel during traveling by preventing a posture change of the vehicle due to an idle spin of the rear wheel.

A preferred embodiment of the present invention includes a steering damper control apparatus to control a steering damping force, the steering damper control apparatus including a damper having an adjustable steering damping force, an idle spin detecting device to detect an idle spin of a rear wheel, and a damping force adjusting device to adjust the damping force of the damper to be higher when the idle spin detecting device detects an idle spin than a damping force of the damper when the rear wheel is not in an idle spin.

According to the preferred embodiment described above, when the idle spin detecting device detects an idle spin of the rear wheel, the damping force adjusting device makes the damping force of the damper higher than the damping force when the rear wheel is not in an idle spin. Therefore, the rear wheel is prevented from skidding sideways about a steering and the damper, thus preventing a posture change of the vehicle. As a result, the steering damper control apparatus prevents the drive of the rear wheel deviating from a traveling direction, thus efficiently using the drive of the rear wheel during traveling.

In a preferred embodiment of the present invention, it is preferable that the idle spin detecting device includes a front wheel rotational frequency detecting device to detect a rotational frequency of a front wheel, a rear wheel rotational frequency detecting device to detect a rotational frequency of the rear wheel, a difference calculating device to calculate a difference in rotational frequency between the front wheel and the rear wheel, and a distinguishing device to distinguish occurrence of an idle spin based on the difference. Based on the rotational frequencies from the front wheel rotational frequency detecting device and the rear wheel rotational frequency detecting device, the difference calculating device calculates a difference in rotational frequency between the front and rear wheels. When this difference is large, it indicates that the rear wheel is in an idle spin. The distinguishing device can distinguish the idle spin based on the difference. Since the idle spin is distinguished based on a rotational frequency difference between the front and rear wheels, there is an advantage of being able to prevent false detection of an idle spin even when a gear slipout occurs in a speed changer.

In a preferred embodiment of the present invention, it is preferable that the distinguishing device includes a storage device to store a first threshold value beforehand, and to distinguish an occurrence of an idle spin based on the difference having exceeded the first threshold value. The first threshold value is stored beforehand in the storage device to enable the distinguishing device to distinguish the occurrence of an idle spin based on this first threshold value and the difference. By setting the first threshold value appropriately, the timing of increasing the damping force of the damper can be adjusted. Therefore, the controllability of the vehicle can be adjusted.

In a preferred embodiment of the present invention, it is preferable that the damping force adjusting device increases the damping force according to the difference in rotational frequency between the front wheel and the rear wheel. Since the damping force of the damper is increased according to the rotational frequency difference, the possibility of giving the rider an unnatural feeling is prevented while preventing posture change.

In a preferred embodiment of the present invention, it is preferable that the storage device includes, stored therein beforehand, a second threshold value larger than the first threshold value; and the damping force adjusting device increases the damping force to a maximum when the difference in rotational frequency between the front wheel and the rear wheel is equal to or larger than the second threshold value. The second threshold value is stored beforehand in the storage device, and the damping force adjusting device increases the damping force to a maximum when the difference in rotational frequency between the front wheel and the rear wheel is equal to or larger than the second threshold value. Therefore, by setting the second threshold value appropriately, the timing of increasing the damping force of the damper to a maximum can be adjusted. Therefore, the controllability of the vehicle can be adjusted.

In a preferred embodiment of the present invention, it is preferable that the idle spin detecting device includes an engine rotational frequency detecting device to detect rotational frequencies of an engine, an increase rate calculating device to calculate a rotational frequency increase rate of the engine based on the rotational frequencies, and a distinguishing device to distinguish an occurrence of an idle spin based on the rotational frequency increase rate. Based on the rotational frequencies of the engine from the engine rotational frequency detecting device, the increase rate calculating device calculates a rotational frequency increase rate of the engine. When this rotational frequency increase rate is large, it indicates that the rear wheel is in an idle spin. Thus, the distinguishing device can distinguish the idle spin based on the rotational frequency increase rate.

In a preferred embodiment of the present invention, it is preferable that the distinguishing device includes a storage device to store a first threshold value set beforehand, and distinguishes an occurrence of an idle spin based on the rotational frequency increase rate having exceeded the first threshold value. The first threshold value is stored beforehand in the storage device to enable the distinguishing device to distinguish the occurrence of an idle spin based on this first threshold value and the rotational frequency increase rate. By setting the first threshold value appropriately, the timing of increasing the damping force of the damper can be adjusted. Therefore, the controllability of the vehicle can be adjusted.

In a preferred embodiment of the present invention, it is preferable that the damping force adjusting device increases the damping force according to the rotational frequency increase rate. Since the damping force of the damper is increased according to the rotational frequency increase rate, the possibility of giving the rider an unnatural feeling is significantly reduced or prevented while preventing posture change.

In a preferred embodiment of the present invention, it is preferable that the apparatus further includes an over-rotation detecting device to detect an over-rotation of the engine; wherein the storage device includes, stored therein beforehand, a second threshold value larger than the first threshold value; and the damping force adjusting device increases the damping force to a maximum when the rotational frequency increase rate is equal to or larger than the second threshold value, or when the over-rotation detecting device detects an over-rotation of the engine. The second threshold value is stored beforehand in the storage device, and when the rotational frequency increase rate is equal to or higher than the second threshold value, or when the over-rotation detecting device detects an over-rotation, the damping force adjusting device increases the damping force of the damper to a maximum. Therefore, by appropriately setting the second threshold value, the timing of increasing the damping force of the damper to a maximum can be adjusted. Therefore, the controllability of the vehicle can be adjusted. Even if the rotational frequency increase rate is less than the second threshold value, the rotational frequency of the engine becoming an over-rotation frequency may be accompanied by an idle spin of the rear wheel. So, when the over-rotation detecting device detects an over-rotation of the engine, even if the rotational frequency increase rate is less than the second threshold value, the damping force of the damper is increased to a maximum, thus preventing a posture change of the vehicle due to an idle spin of the rear wheel with high accuracy.

In a preferred embodiment of the present invention, it is preferable that the idle spin detecting device includes a throttle position sensor to detect a throttle opening degree, a change rate calculating device to calculate a change rate of the throttle opening degree, and a presuming device to presume an occurrence of an idle spin based on the change rate. Based on the throttle opening degree from the throttle position sensor, the change rate calculating device calculates a change rate. When the change rate is large, the probability of the rear wheel going into an idle spin is extremely high. Thus, the presuming device can presume an idle spin of the rear wheel based on the change rate. Therefore, the damping force of the damper is increased before the idle spin of the rear wheel actually starts, thus promptly preventing posture change.

In a preferred embodiment of the present invention, it is preferable that the presuming device includes a storage device to store a first threshold value beforehand, and presumes an occurrence of an idle spin based on the change rate having exceeded the first threshold value. The first threshold value is stored beforehand in the storage device to enable the presuming device to presume the occurrence of an idle spin of the rear wheel based on this first threshold value and the throttle opening degree change rate. By setting the first threshold value appropriately, the timing of increasing the damping force of the damper can be adjusted. Therefore, the controllability of the vehicle can be adjusted.

In a preferred embodiment of the present invention, it is preferable that the damping force adjusting device increases the damping force according to the change rate. Since the damping force of the damper is increased according to the throttle opening degree change rate, the possibility of giving the rider an unnatural feeling is prevented while preventing posture change.

In a preferred embodiment of the present invention, it is preferable that the storage device includes, stored therein beforehand, a second threshold value larger than the first threshold value, and the damping force adjusting device increases the damping force to a maximum when the change rate is equal to or larger than the second threshold value. The second threshold value is stored beforehand in the storage device, and when the absolute value of the throttle opening degree change rate is equal to or higher than the second threshold value, the damping force adjusting device increases the damping force of the damper to a maximum. Therefore, by appropriately setting the second threshold value, the timing of increasing the damping force of the damper to a maximum can be adjusted. Consequently, the controllability of the vehicle can be adjusted.

In a preferred embodiment of the present invention, it is preferable that the apparatus further includes a pressure detecting device to detect a pressure of a suspension of the front wheel; a pressure lower limit storage device to store a lower limit of the pressure stored beforehand; and a front wheel noncontact determining device to determine that the front wheel has changed from a ground-contacting state to a noncontact state when the pressure detected by the pressure detecting device is at the lower limit, and the pressure remains at the lower limit for a predetermined time; wherein the damping force adjusting device makes the damping force zero when the front wheel noncontact determining device determines that the front wheel is in the noncontact state. When the pressure detected by the pressure detecting device is at the lower limit, and the pressure remains at the lower limit for a predetermined time, the front wheel noncontact determining device determines that the front wheel has changed from a ground-contacting state to a noncontact state, and the damping force adjusting device makes the damping force zero. When the rider intentionally causes the vehicle to jump, the rider has a desire to make a steering angle large. Then, the rider is determined to have intentionally caused the jump, based on the pressure of the suspension, to facilitate steering.

The saddle riding type vehicle according to a preferred embodiment of the present invention includes the steering damper control apparatus described above.

According to the preferred embodiment described above, since the damping force of the damper is made higher than the damping force when the rear wheel is not in an idle spin, the rear wheel can be prevented from skidding sideways, thus preventing a posture change of the saddle riding type vehicle. As a result, the steering damper control apparatus prevents the drive of the rear wheel of the saddle riding type vehicle deviating from a traveling direction, thus efficiently using the drive of the rear wheel of the saddle riding type vehicle during traveling.

According to the steering damper control apparatus of the present preferred embodiment, when the idle spin detecting device detects an idle spin of the rear wheel, the damping force adjusting device makes the damping force of the damper higher than the damping force when the rear wheel is not in an idle spin. Therefore, the rear wheel is prevented from skidding sideways about a steering and the damper, thus preventing a posture change of the vehicle. As a result, the steering damper control apparatus prevents the drive of the rear wheel deviating from a traveling direction, thus efficiently using the drive of the rear wheel during traveling.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A to 3C are views showing a construction of an MR damper, in which FIG. 3A is a view in vertical section showing an outline of the MR damper, FIG. 3B is an exploded perspective view, and FIG. 3C is an enlarged fragmentary sectional view.

FIG. 4 is a block diagram showing an outline of a steering damper control apparatus according to the first preferred embodiment of the present invention.

DETAILED DESCRIPTION OF THE PREFERRED EMBODIMENTS

A first preferred embodiment of the present invention will be described hereinafter with reference to the drawings.

A motorcycle will be described as an example of saddle riding type vehicles including a steering damper control apparatus according to preferred embodiments of the present invention.

Figure 1:
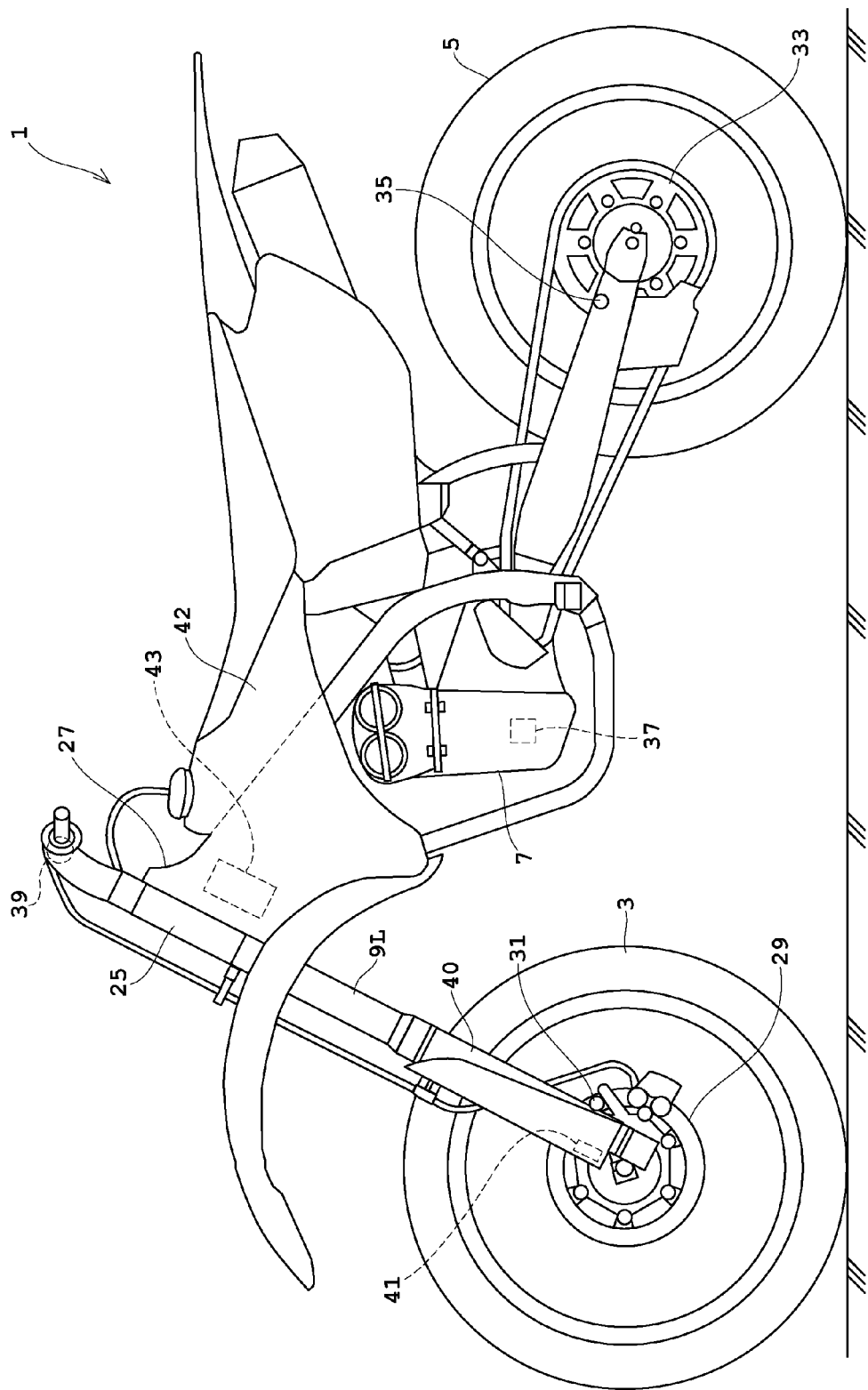
FIG. 1 is a side view showing an outline of a motorcycle according to a first preferred embodiment of the present invention.
Figure 2:
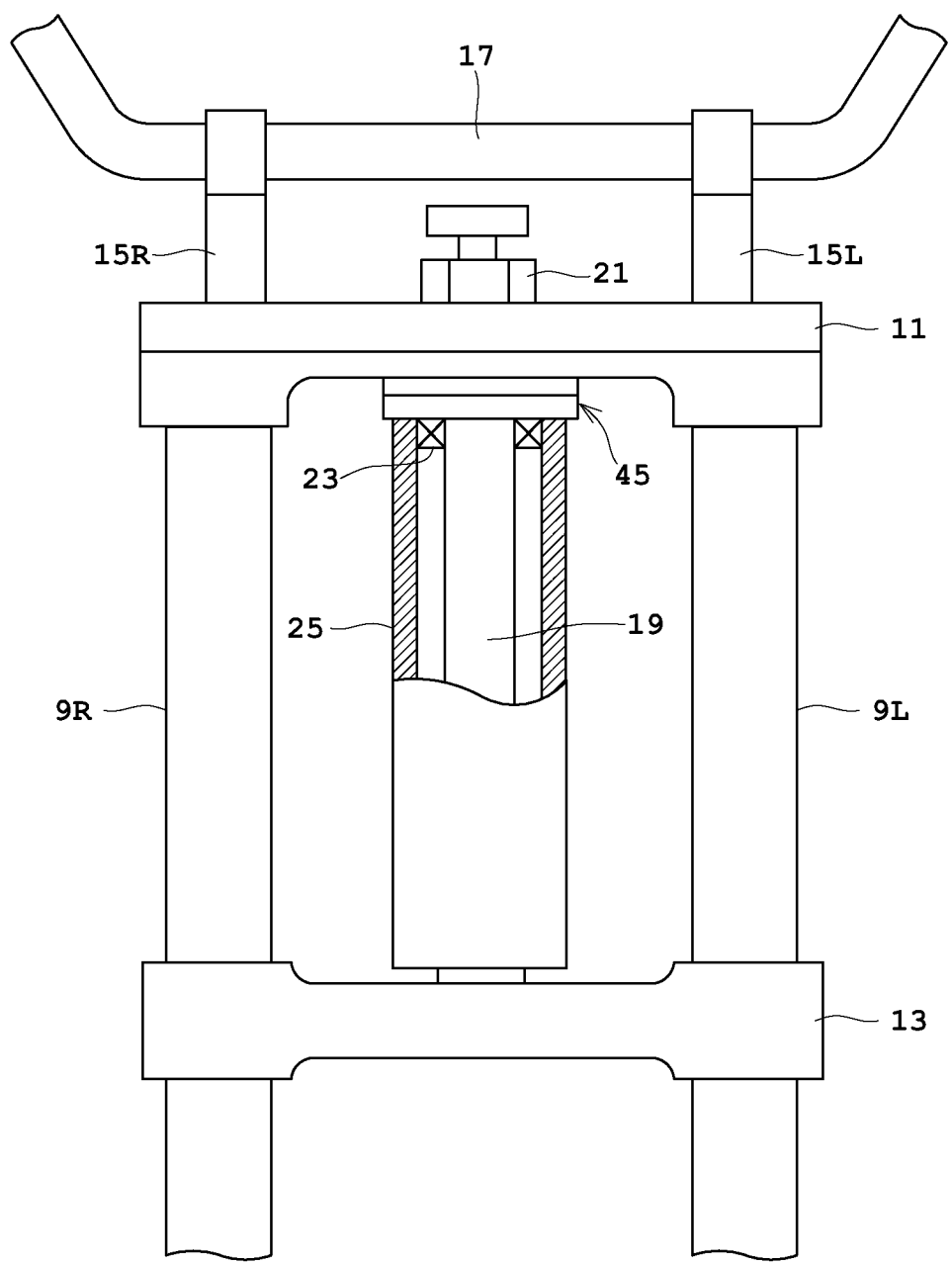
FIG. 2 is a front view partly in section showing a construction around a steering crown.

FIG. 1 is a side view showing an outline of a motorcycle according to the first preferred embodiment. FIG. 2 is a front view partly in section showing a construction around a steering crown.

A motorcycle 1 includes a front wheel 3 and a rear wheel 5. The rear wheel 5 is driven to rotate by a driving force generated by an engine 7. The front wheel 3 is rotatably supported by a pair of left and right front forks 9L and 9R. The front forks 9L and 9R include upper ends connected to and supported by a steering crown 11. The front forks 9L and 9R include intermediate portions connected to and supported by an under bracket 13. The steering crown 11 includes a pair of left and right handle holders 15L and 15R arranged on an upper surface thereof. These handle holders 15L and 15R hold a steering bar 17 controllable by the rider. The handle crown 11 and under bracket 13 are connected by a steering shaft 19. The lower end of the steering shaft 19 is engaged by a steering shaft receiver (not shown) of the under bracket 13 so as not to come off upward. The upper end of the steering shaft 19 is preferably secured to the steering crown 11 with a nut 21, for example.

The steering shaft 19 is rotatably supported by a head pipe 25 through bearings 23. The head pipe 25 is connected to a vehicle body frame 27. When the rider operates the steering bar 17, a steering force is transmitted to the front forks 9L and 9R through the steering shaft 19 to steer the front wheel 3.

A front wheel speed sensor 31 to detect rotational frequencies of the front wheel 3 is disposed adjacent to a disk brake 29 provided on the front wheel 3. A rear wheel speed sensor 35 to detect rotational frequencies of the rear wheel 5 is disposed adjacent to a driven sprocket 33 provided on the rear wheel 5. An engine rotational frequency sensor 37 to detect rotational frequencies of the engine is disposed adjacent to a crankshaft (not shown) of the engine 7. A throttle position sensor 39 to detect throttle opening degrees is disposed adjacent to an accelerator grip (not shown) of the steering bar 17. The front fork 9L includes a suspension pressure sensor 41 to detect pressures of a front suspension 40. The output of each sensor is inputted to a controller 43 disposed in front of a fuel tank 42.

Figure 3A:
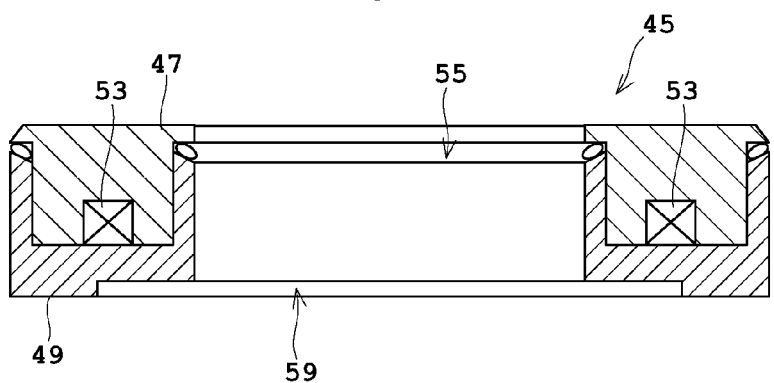
Figure 3B:
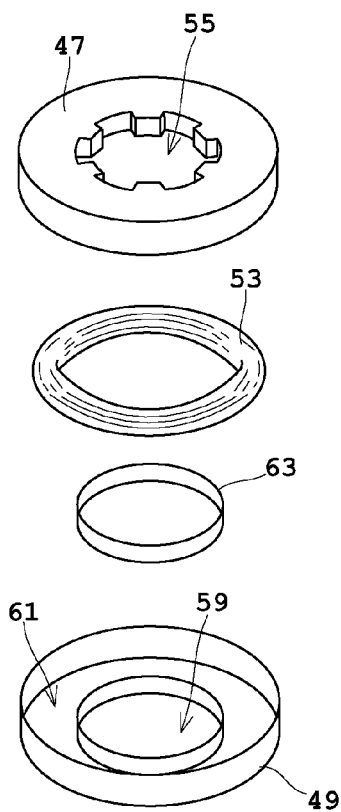
Figure 3C:
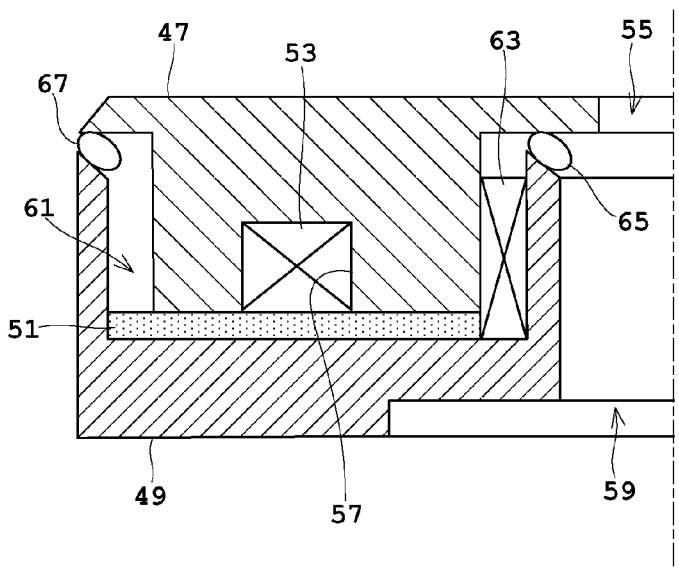

An MR (magneto-rheological) damper 45 is disposed below the steering crown 11. This MR damper 45 uses a magnetic fluid to generate damping forces for rotation of the steering shaft 19 occurring with steering operation. The construction of the MR damper 45 will be described with reference to FIGS. 3A to 3C. FIGS. 3A to 3C show the construction of the MR damper 45, in which FIG. 3A is a view in vertical section showing an outline of the MR damper, FIG. 3B is an exploded perspective view, and FIG. 3C is an enlarged fragmentary sectional view.

The MR damper 45 includes an upper yoke 47 and a lower yoke 49, a magnetic fluid 51, and a magnetic field generating coil 53. The magnetic fluid 51 is interposed between the upper yoke 47 and the lower yoke 49. The magnetic field generating coil 53 applies a magnetic field to the magnetic fluid 51. The upper yoke 47 includes a through-hole 55 in a center thereof to receive the steering shaft 19, and has an annular or substantially annular shape. The upper yoke 47 is preferably made of a magnetic material such as rolled steel, for example.

The upper yoke 47 includes an annular groove 57 in the bottom thereof. This annular groove 57 houses the magnetic field generating coil 53. The magnetic field generating coil 53 is supplied with a current corresponding to a steering damping force from the controller 43.

Similarly to the upper yoke 47, the lower yoke 49 includes a through-hole 59 in a center thereof to receive the steering shaft 19, and has an annular or substantially annular shape. As is the upper yoke 47, the lower yoke 49 also is made of a magnetic material such as rolled steel. An annular groove 61 is provided in the upper surface of the lower yoke 49. This groove 61 fits the upper yoke 47 therein.

The groove 61 of the lower yoke 49 includes, fitted on an inner wall thereof, a cylindrical collar 63 made of a metallic material such as aluminum. The upper yoke 47 is rotatably held by the lower yoke 49 through this collar 63. The collar 63 may be replaced with a well-known roll bearing. However, by using the collar 63 the MR damper 45 can be reduced in size.

The lower yoke 49 houses the magnetic fluid 51 in the groove 61. The bottom of the groove 61 of the lower yoke 49 and the lower surface of the upper yoke 47 are opposed to each other with the magnetic fluid 51 in between. Preferably, the magnetic fluid 51 contains about 40% of carbonyl iron, for example. When the magnetic field is applied to the magnetic fluid 51, its viscosity will increase the damping force of the MR damper 45. The magnetic fluid 51 has a certain fixed viscosity without the magnetic field applied thereto. Thus, the MR damper 45 generates a minimum damping force when no magnetic field is applied.

O-rings 65 and 67 are fitted in inner and outer annular gaps in between the upper yoke 47 and the lower yoke 49. The O-rings 65 and 67 prevent the leakage of the magnetic fluid 51, and prevent dust and the like from entering the MR damper 45.

The lower yoke 49 is connected to the head pipe 25, and the upper yoke 47 is connected to the steering crown 11. That is, the lower yoke 49 is connected to the vehicle body, while the upper yoke 47 is connected to the steering bar 17. Consequently, when the steering bar 17 is operated, the magnetic fluid 51 interposed between the upper yoke 47 and the lower yoke 49 produces a resistance according to its viscosity, and this resistance serves as the steering damping force acting on the steering bar 17.

The MR damper 45 described above corresponds to a "damper" in the present preferred embodiment.

The controller 43 will be described in detail with reference to FIG. 4. FIG. 4 is a block diagram showing an outline of the steering damper control apparatus according to the first preferred embodiment of the present invention.

The controller 43 includes a normal control unit 71, a posture change responsive control unit 73, a damping force adjusting unit 75, and a damper driver 77.

The normal control unit 71 calculates a damping force command value to control the MR damper 45 in a normal state in which the rear wheel 5 is not in an idle spin. The posture change responsive control unit 73 calculates a damping force command value to control the MR damper 45 when there is a possibility of posture change with the rear wheel 5 in an idle spin. The damping force adjusting unit 75 controls the damper driver 77 based on a command value of a plurality of damping force command values provided by the normal control unit 71 and the posture change responsive control unit 73. The damper driver 77 outputs a drive current based on the damping force command value to the magnetic field generating coil 53 of the MR damper 45. The normal control unit 69 also outputs a cancellation signal which reduces the damping force of the MR damper 45 to a minimum as described below.

The normal control unit 71 includes a pressure change rate calculating unit 79, a command value output unit 81, a non-contact determining unit 83, and a noncontact-related memory 85.

The pressure change rate calculating unit 79 calculates a pressure change rate of the front suspension 40 based on pressure signals from the suspension pressure sensor 41. The calculated pressure change rate is provided to the command value output unit 81. The command value output unit 81 determines a damping force command value based on a reference table 81a stored beforehand.

Figure 5:
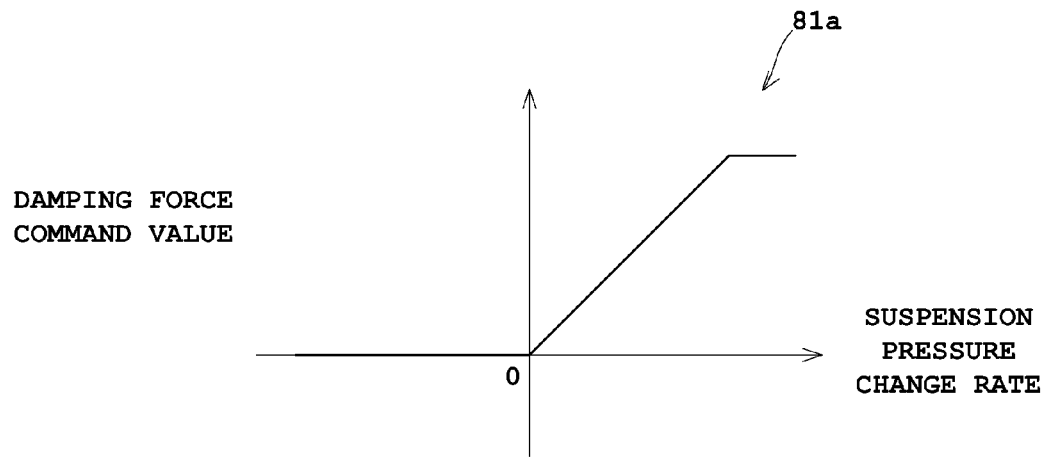
FIG. 5 is a view schematically showing a table used to calculate a damping force command value based on a suspension pressure change rate.

Reference is now made to FIG. 5. FIG. 5 is a view schematically showing a table used to calculate a damping force command value based on the suspension pressure change rate.

When the pressure change rate is zero, it indicates that the motorcycle 1 is traveling steadily. When traveling on a flat road, for example, it shows a stable state where the front suspension 40 is contracted to a certain extent, and there occurs no additional contractions or extensions. When the pressure change rate is negative, it indicates that the contracted front suspension 40 is extending. On the other hand, when the pressure change rate is positive, it indicates that the extended front suspension 40 is contracting.

The table used to calculate a damping force command value 81a has been set beforehand as follows. For a range of suspension change rates from negative to 0, the damping force command value is set to a minimum. That is, when the front suspension 40 is stable with no contraction or extension, or is extending from a contracted state, the damping force command value is set to a minimum to allow the steering bar 17 to be turned easily. When the suspension change rates are in a positive range exceeding 0, the damping force command value is gradually increased at a constant rate. That is, when the front suspension 40 is contracting from an extended state, the damping force command value is enlarged to render the steering bar 17 more difficult to turn. When the suspension change rate exceeds a fixed value, the damping force command value is fixed to a maximum. The command value output unit 81 outputs a damping force command value to the damping force adjusting unit 75 based on a suspension change rate provided by the pressure change rate calculating unit 79 and the above-mentioned table used to calculate a damping force command value 81a.

The noncontact determining unit 83 determines whether the front wheel 3 is in contact with the ground surface based on an output of the suspension pressure sensor 41 indicating a pressure of the front suspension 40. At this time, it refers to the noncontact-related memory 75. This noncontact-related memory 75 includes, stored therein beforehand, a lower limit of pressure and a predetermined time for determining noncontact. The noncontact determining unit 83 monitors a pressure signal of the suspension pressure sensor 41, and determines noncontact of the front wheel 3 based on whether the pressure signal is at the lower limit of pressure for the predetermined time. This is done in order to determine whether the rider of the motorcycle 1 is jumping intentionally. When the motorcycle 1 is jumped intentionally, the front wheel 3 is in a noncontact state for a long time compared with a time of normal traveling. Then, the front suspension 40 is extended to a maximum extent, and the pressure of the suspension 40 maintains a certain value for a fixed period of time. This is determined from the lower limit of pressure and the predetermined time. When a determination suggesting noncontact is occurring, the noncontact determining unit 83 outputs a cancellation signal to the damping force adjusting unit 75.

The suspension pressure sensor 41 described above corresponds to the "pressure detecting device" in the present preferred embodiment. The noncontact-related memory 85 corresponds to the "pressure lower limit storage device" in the present preferred embodiment. The noncontact determining unit 83 corresponds to the "front wheel noncontact determining device" in the present preferred embodiment.

The posture change responsive control unit 73 includes a rotational frequency difference calculating unit 87 and a command value output unit 89.

The rotational frequency difference calculating unit 87 calculates a difference between the rotational frequencies of the front wheel 3 and rear wheel 5 based on the outputs of the front wheel speed sensor 31 and rear wheel speed sensor 35. The calculated rotational frequency difference is provided to the command value output unit 89. The command value output unit 89 determines a damping force command value based on the absolute value of the rotational frequency difference and a table used to calculate a damping force command value 89a stored beforehand.

Figure 6:
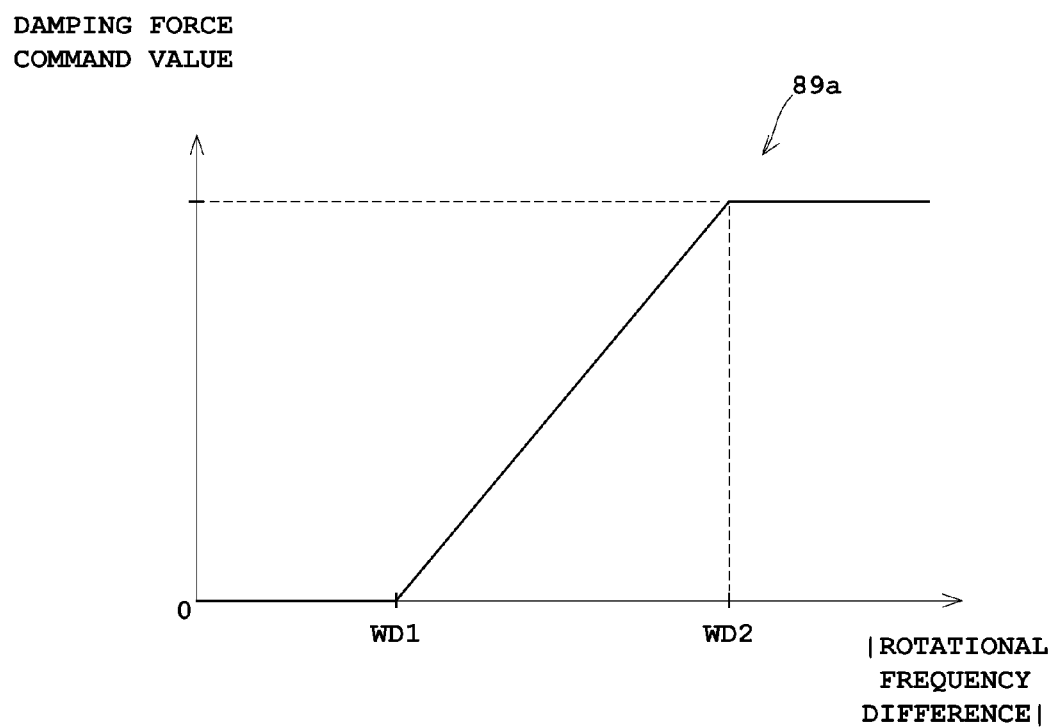
FIG. 6 is a view schematically showing a table used to calculate a damping force command value based on the absolute value of a rotational frequency difference.

Reference is now made to FIG. 6. FIG. 6 is a view schematically showing a table used to calculate a damping force command value based on the absolute value of a rotational frequency difference.

The "absolute value" of the rotational frequency difference is used as a criterion for judgment in order to cope with both the case of the rear wheel 5 spinning idly during acceleration of the motorcycle 1 and the case of the rear wheel 5 being locked and spinning idly. When the absolute value of the rotational frequency difference is zero, it indicates that the wheel speeds of the front wheel 3 and rear wheel 5 are the same and the rear wheel 5 is not in an idle spin. When the absolute value of the rotational frequency difference reaches a certain amount, it indicates that the rotational frequency difference between the front wheel 3 and the rear wheel 5 has become large, and that the rear wheel 5 has started a slight idle spin. When the absolute value of the rotational frequency difference becomes larger, it indicates that the rear wheel 5 has started a significant idle spin.

The table used to calculate a damping force command value 81a is set beforehand as follows. Up to a certain amount of the absolute value of the rotational frequency difference, even if the rear wheel 5 has started spinning idly, the rear wheel 5 will hardly cause a posture change as to move to a large extent sideways about the head pipe 25. Therefore, the damping force command value is maintained at zero until the absolute value of the rotational frequency difference reaches the certain amount. And when the absolute value of the rotational frequency difference becomes larger, the idle spin of the rear wheel 5 will exert a great influence on the posture change of the motorcycle 1. Specifically, the rear wheel 5 moves sideways to a great extent such that the drive of the rear wheel 5 will begin to deviate greatly from the traveling direction. So, when the absolute value of the rotational frequency difference reaches a first threshold value WD1, the damping force command value is raised at a constant rate to a second threshold value WD2. Consequently, the damping force of the MR damper 45 is progressively increased with the idle spin of the rear wheel 5. As a result, it prevents the rear wheel 5 deviating to a large extent sideways. And when the absolute value of the rotational frequency difference reaches or exceeds the second threshold value WD2, the damping force command value is set to a maximum. In this manner, the command value output unit 89 outputs the damping force command value to the damping force adjusting unit 75 based on the absolute value of the rotational frequency difference provided by the rotational frequency difference calculating unit 87 and the above table used to calculate a damping force command value 89a.

The damping force adjusting unit 75 receives the damping force command value from the normal control unit 71, the cancellation signal from the normal control unit 71, and the damping force command value from the posture change responsive control unit 73. The damping force adjusting unit 75 provides one of the two damping force command values to the damper driver 77 based on an idle spin detection flag which will be described below. On the other hand, when the cancellation signal is received, the damping force command value provided to the damper driver 77 at this time is cancelled, and the minimum damping force command value is provided to the damper driver 77. The damper driver 77 outputs an electric current value corresponding to the damping force command value to the magnetic field generating coil 53 of the MR damper 45.

The front wheel speed sensor 31, rear wheel speed sensor 35, rotational frequency difference calculating unit 87, and command value output unit 89 correspond to the "idle spin detecting device" according to a preferred embodiment of the present invention. The damper driver 77 corresponds to the "damping force adjusting device" in the present preferred embodiment. The front wheel speed sensor 31 corresponds to the "front wheel rotational frequency detecting device" in the present preferred embodiment. The rear wheel speed sensor 35 corresponds to the "rear wheel rotational frequency detecting device" in the present preferred embodiment. The rotational frequency difference calculating unit 87 corresponds to the "difference calculating device" in the present preferred embodiment. The command value output unit 89 corresponds to the "distinguishing device" and the "storage device" in the present preferred embodiment. The first threshold value WD1 and second threshold value WD2 in the table used to calculate damping force command value 89a noted above correspond to the "first threshold value" and the "second threshold value" in the present preferred embodiment.

Figure 7:
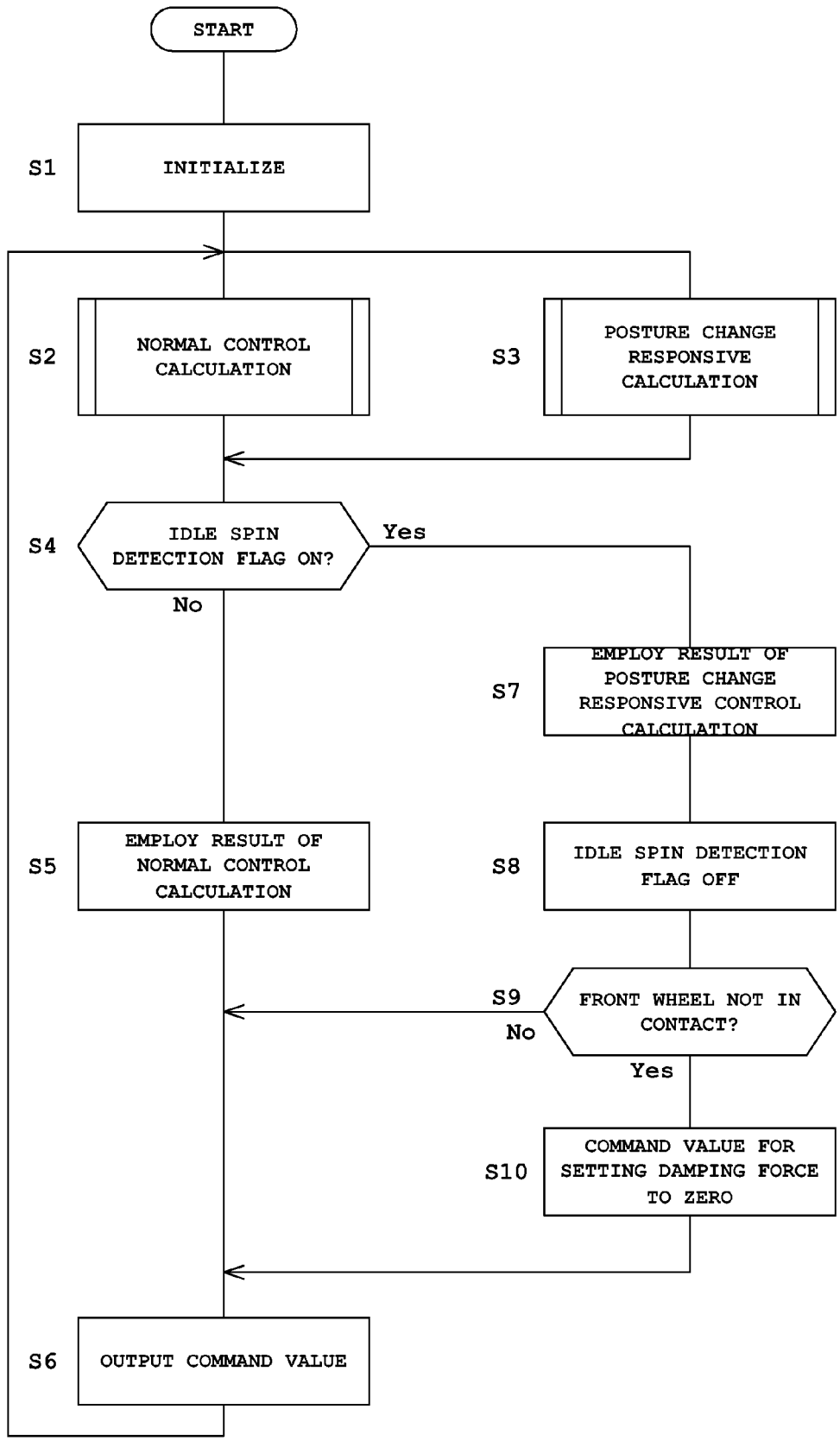
FIG. 7 is a flow chart showing an operation of the steering damper control apparatus.
Figure 8:
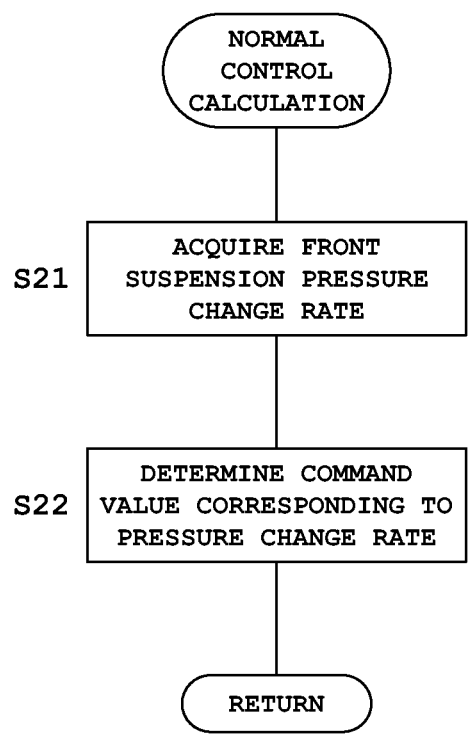
FIG. 8 is a flow chart showing an operation of a normal control calculation.
Figure 9:
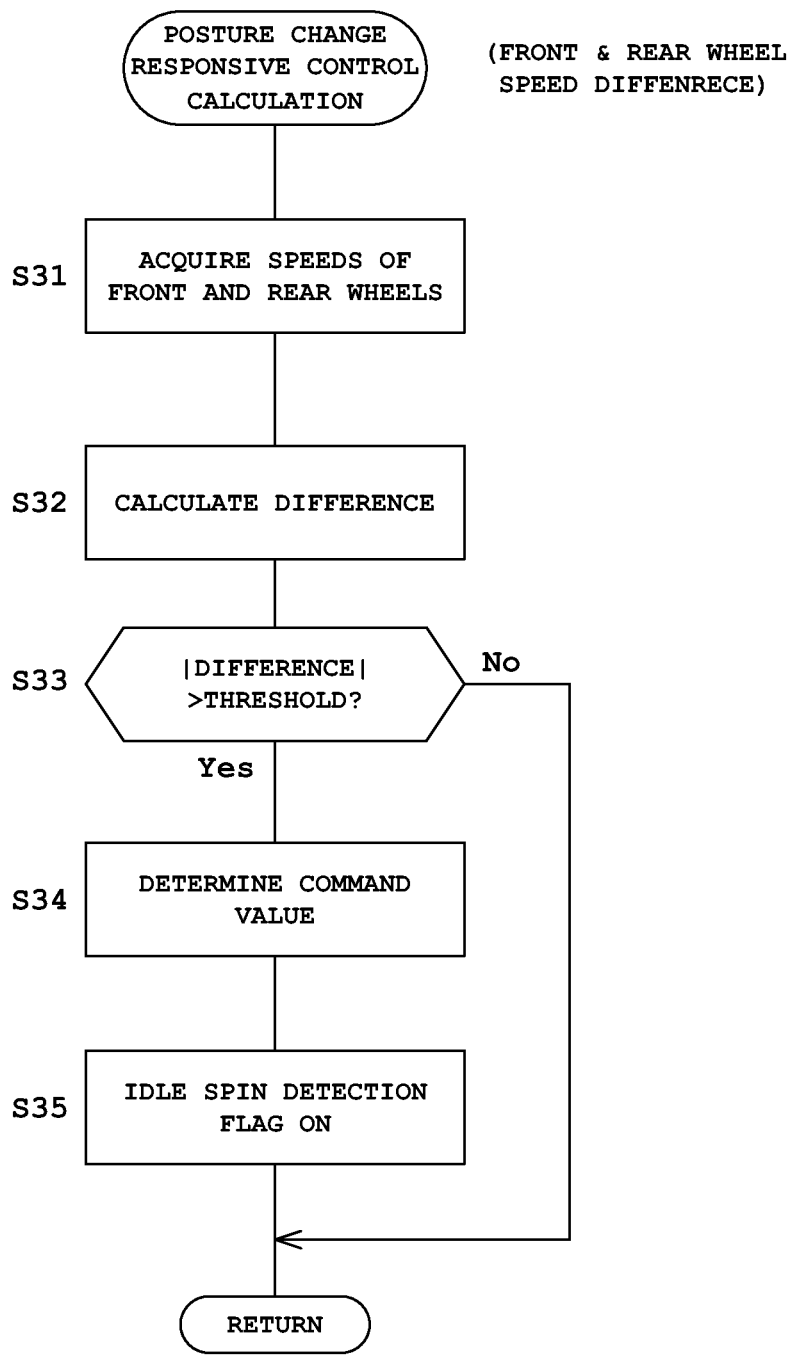
FIG. 9 is a flow chart showing an operation of a posture change responsive control calculation.

Operations will be described with reference to FIG. 7 to FIG. 9. FIG. 7 is a flow chart showing an operation of the steering damper control apparatus. FIG. 8 is a flow chart showing an operation of a normal control calculation. FIG. 9 is a flow chart showing an operation of a posture change responsive control calculation.

Step S1

The controller 43 is initialized. Specifically, the damping force command value provided to the damping force adjusting unit 75 is set to a minimum value zero. This places the MR damper 45 in a state of producing no damping force.

Step S2

An arithmetic processing for normal control is carried out.

Reference is now made to FIG. 8.

Steps S21, S22

The normal control unit 71 acquires pressures of the front suspension 40 from the suspension pressure sensor 41. And a damping force command value is determined based on the pressure change rate from the pressure change rate calculating unit 79, and the table used to calculate a damping force command value 81a described above.

Step S3

In parallel with the above normal control, a posture change responsive control calculation is carried out.

Reference is now made to FIG. 9.

Steps S31, S32

The rotational frequency difference calculating unit 87 receives signals from the front wheel speed sensor 31 and the rear wheel speed sensor 35, and calculates a difference between the speeds of the front wheel 3 and rear wheel 5.

Steps S33-S35

The command value output unit 89 branches the process based on the absolute value of the difference between the rotational frequencies of the front and rear wheels and the table used to calculate a damping force command value 89a. Specifically, the process is branched based on whether or not the absolute value of the rotational frequency difference exceeds the first threshold value WD1. When the first threshold value WD1 is not exceeded, branching is made to step S4 in FIG. 7. On the other hand, when the first threshold value WD1 is exceeded, a damping force command value is determined based on the absolute value of the rotational frequency difference and the table used to calculate a damping force command value 89a. After turning the idle spin detection flag ON, which indicates that an idle spin has been detected, the process returns to step S4 in FIG. 7.

Reference is now made back to FIG. 7.

Step S4

The process is branched according to the state of the idle spin detection flag. Specifically, when the idle spin detection flag is ON, the process branches to step S7. When the idle spin detection flag is OFF, it branches to step S5. The case of the idle spin detection flag being OFF will be described first.

Step S5

Since the idle spin detection flag is OFF, the rear wheel 5 is not in an idle spin, or if any, it is a slight idle spin not causing a posture change. Then, in this case, the damping force command value of the normal control unit 71 is used.

Step S6

The damping force adjusting unit 75 provides the damping force command value used at this time to the damper driver 77.

Next, the case of the idle spin detection flag being ON will be described.

Steps S7, S8

Since the idling detection flag is ON, the rear wheel 5 is spinning idly which influences a posture change. Then, in this case, the damping force command value of the posture change responsive control unit 73 is used. And the idle spin detection flag is turned OFF.

Steps S9, S10

When the front wheel 3 is in a state of noncontact and the cancellation signal is outputted from the noncontact determining unit 83, a minimum value zero is used as the damping force command value. Consequently, when the rider of the motorcycle 1 makes a jump intentionally, the steering bar 17 can be turned with ease. When the front wheel 3 is in contact with the ground and the cancellation signal is not outputted from the noncontact determining unit 83, the process moves to step S6.

When the command value output unit 89 detects an idle spin of the rear wheel 5, the steering damper control apparatus in the present preferred embodiment causes the damper driver 77 to make the damping force of the MR damper 45 higher than the damping force used when the rear wheel 5 is not in an idle spin. Therefore, the rear wheel 5 can be prevented from skidding sideways about the head pipe 25, thus preventing a posture change of the motorcycle 1. As a result, it can prevent the drive of the rear wheel 5 deviating from the traveling direction, thus efficiently using the drive of the rear wheel 5 during traveling.

Based on the rotational frequencies from the front wheel 3 and rear wheel 5, the rotational frequency difference calculating unit 87 calculates a difference in rotational frequencies between the front and rear wheels. When this difference is large, it indicates that the rear wheel 5 is in an idle spin. The command value output unit 89 can distinguish the idle spin based on the difference. Since the idle spin is distinguished based on a rotational frequency difference between the front and rear wheels, there is an advantage of being able to prevent a false detection of an idle spin even when a gear slipout occurs in the engine 7.

The first threshold value WD1 is stored beforehand in the table used to calculate a damping force command value 89a to enable the command value output unit 89a to distinguish the occurrence of an idle spin based on this first threshold value WD1 and the difference. By setting the first threshold value WD1 appropriately, the timing of increasing the damping force of the MR damper 45 can be adjusted. Therefore, the controllability of the motorcycle 1 can be adjusted.

As shown in the table used to calculate a damping force command value 89a, the damping force of the MR damper 45 is increased with the force command value according to the rotational frequency difference from the first threshold value WD1 to the second threshold value WD2. This, while preventing posture change, also reduces the possibility of giving the rider an unnatural feeling.

By setting the second threshold value WD2 appropriately to the table used to calculate a damping force command value 89a, the timing of increasing the damping force of the MR damper 45 to a maximum can be adjusted. Therefore, the controllability of the motorcycle 1 can be adjusted.

A second preferred embodiment of the present invention will be described with reference to the drawings.

Figure 10:
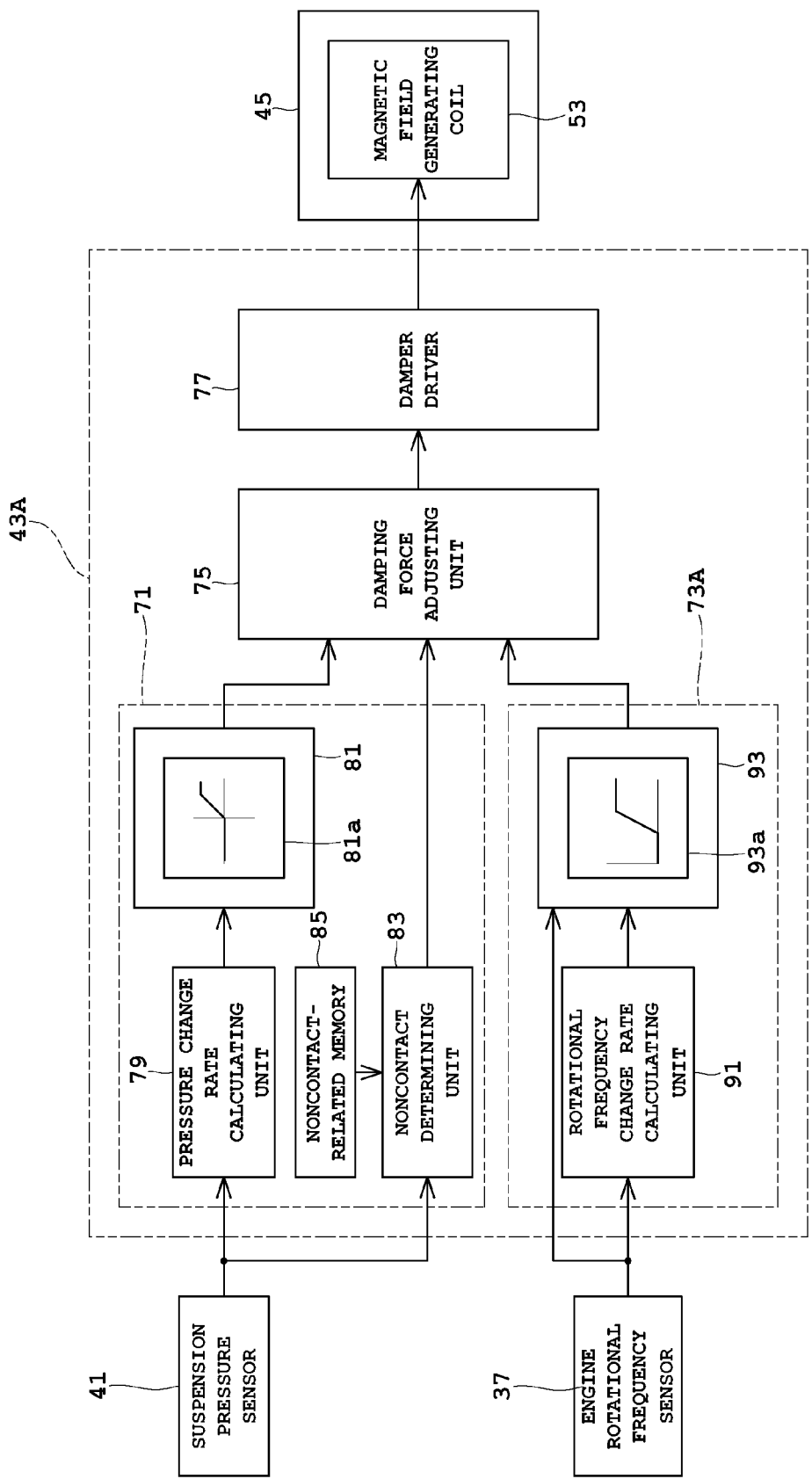
FIG. 10 is a block diagram showing an outline of a steering damper control apparatus according to a second preferred embodiment of the present invention.

FIG. 10 is a block diagram showing an outline of a steering damper control apparatus according to a second preferred embodiment. Like reference signs are affixed to like components which are the same as in the foregoing first preferred embodiment and will not particularly be described.

The controller 43A according to the second preferred embodiment preferably includes the normal control unit 71, a posture change responsive control unit 73A, the damping force adjusting unit 75, and the damper driver 77. The posture change responsive control unit 73A is different from that in the foregoing first preferred embodiment.

The posture change responsive control unit 73A includes a rotational frequency change rate calculating unit 91 and a command value output unit 93.

The rotational frequency change rate calculating unit 91 of the posture change responsive control unit 73A calculates a change rate of the rotational frequency of the engine 7 based on the outputs of the engine rotational frequency sensor 37. Specifically, moving average deviations of engine rotational frequencies successively outputted from the engine rotational frequency sensor 37 are calculated, and differences thereof from current engine frequencies are calculated to obtain the change rate. The change rate of the rotational frequency is provided to the command value output unit 93. The command value output unit 93 determines a damping force command value based on the absolute value of the rotational frequency rate and a table used to calculate a damping force command value 93a stored beforehand.

The command value output unit 93 is programmed to detect an over-rotation of the engine 7. For example, the command value output unit 93 is provided a signal corresponding to the ignition pulse, and by monitoring this ignition pulse, can determine whether the engine 7 is in an over-rotation state. Specifically, when the engine 7 comes into an over-rotation state, ignition control is carried out to reduce the ignition pulses. Therefore, by monitoring the ignition pulse, whether the engine 7 has come into an over-rotation state is determined. The command value output unit 93 sets the damping force command value to a maximum when an over-rotation state is detected regardless of the rotational frequency change rate.

Figure 11:
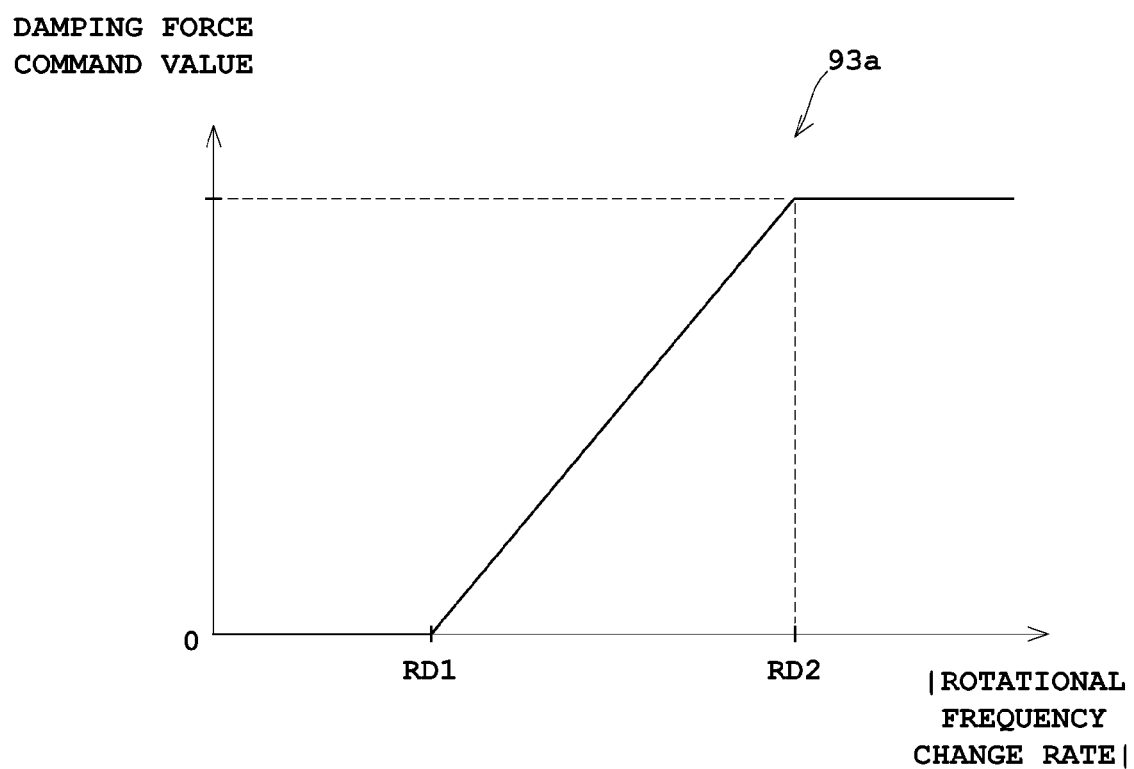
FIG. 11 is a view schematically showing a table used to calculate a damping force command value based on the absolute value of a rotational frequency change rate.

Reference is now made to FIG. 11. FIG. 11 is a view schematically showing a table used to calculate a damping force command value based on the absolute value of the rotational frequency change rate.

The "absolute value" of the rotational frequency change rate is used as a criterion for judgment in order to cope with both acceleration and deceleration of the motorcycle 1. When the absolute value of the rotational frequency change rate is zero, it indicates that the vehicle is traveling at a constant speed. When the absolute value of the rotational frequency change rate reaches a certain amount, it indicates that the grip of the rear wheel 5 has begun to be exceeded and the rear wheel 5 has started a slight idle spin. When the absolute value of the rotational frequency change rate becomes larger, it indicates that the rear wheel 5 has started a significant idle spin.

The table used to calculate a damping force command value 93a has been set beforehand as follows.

Up to a certain amount of the absolute value of the rotational frequency change rate, even if the rear wheel 5 has started spinning idly, the rear wheel 5 will hardly cause such a posture change as to move to a large extent sideways about the head pipe 25. Therefore, the damping force command value is maintained at zero until the absolute value of the rotational frequency change rate reaches the certain amount. And when the absolute value of the rotational frequency change rate becomes larger, the idle spin of the rear wheel 5 will exert a great influence on the posture change of the motorcycle 1. Specifically, the rear wheel 5 moves to a great extent sideways such that the drive direction of the rear wheel 5 will begin to deviate greatly from the traveling direction. So, when the absolute value of the rotational frequency change rate reaches a first threshold value RD1, the damping force command value is raised gradually from here to a second threshold value RD2. Consequently, the damping force of the MR damper 45 is progressively increased with the idle spin of the rear wheel 5. As a result, it prevents the rear wheel 5 from deviating to a large extent sideways. And when the absolute value of the rotational frequency change rate reaches or exceeds the second threshold value RD2, the damping force command value is fixed to a maximum. In this manner, the command value output unit 93 outputs the damping force command value to the damping force adjusting unit 75 based on the absolute value of the rotational frequency change rate provided from the rotational frequency change rate calculating unit 91 and the table used to calculate a damping force command value 93a.

The engine rotational frequency sensor 37, rotational frequency change rate calculating unit 91, and command value output unit 93 correspond to the "idle spin detecting device" in the present preferred embodiment. The engine rotational frequency sensor 37 corresponds to the "engine rotational frequency detecting device" in the present preferred embodiment. The rotational frequency change rate calculating unit 91 corresponds to the "increase rate calculating device" in the present preferred embodiment. The command value output unit 93 corresponds to the "distinguishing device" and the "storage device" in the present preferred embodiment. The first threshold value RD1 and second threshold value RD2 stored in the table used to calculate a damping force command value 93a correspond to the "first threshold value" and the "second threshold value" in the present preferred embodiment. The command value output unit 93 corresponds to the "over-rotation detecting device" in the present preferred embodiment.

Figure 12:
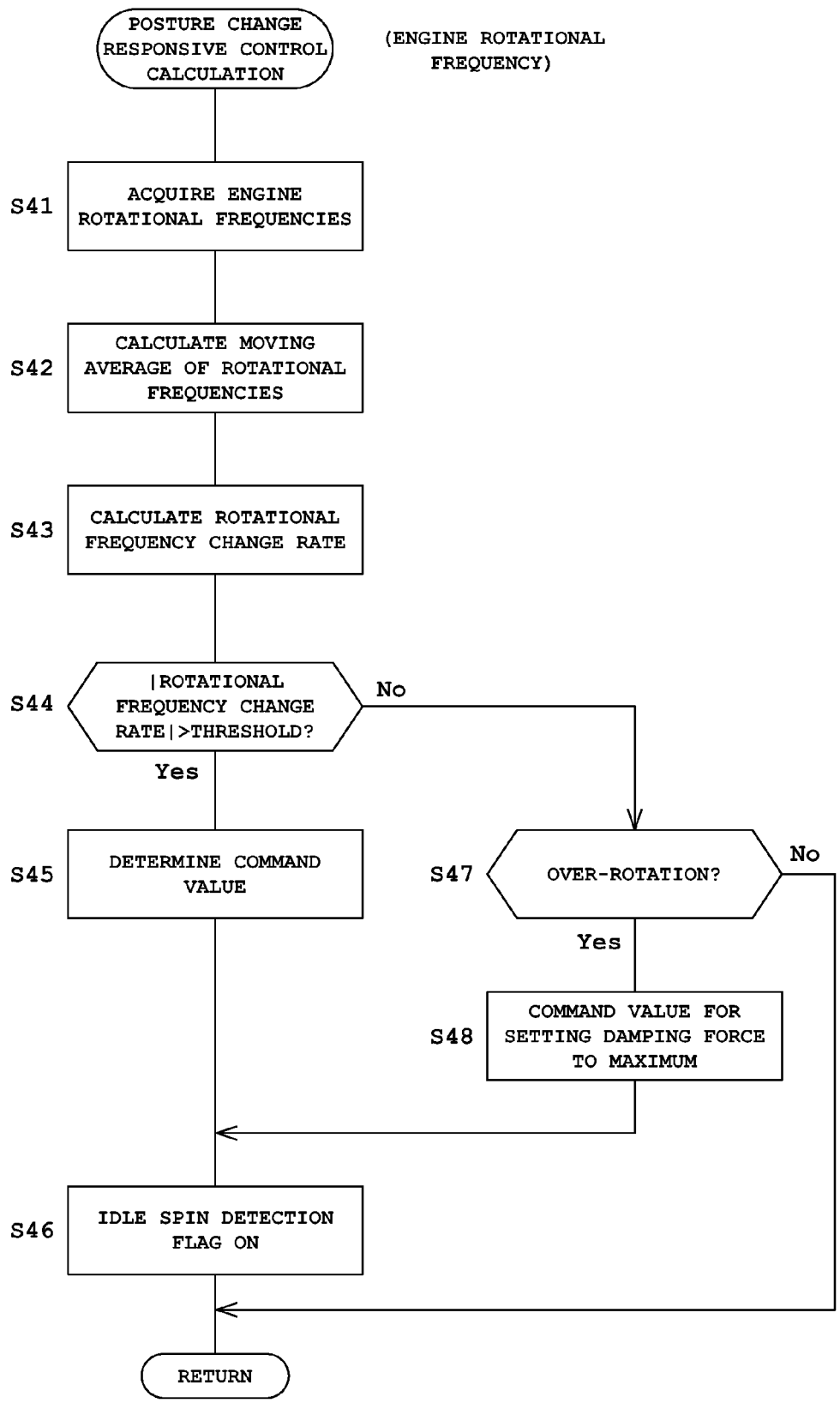
FIG. 12 is a flow chart showing an operation of a posture change responsive control calculation.

Operation of the steering damper control apparatus will be described with reference to FIG. 12. FIG. 12 is a flow chart showing operation of the posture change responsive control calculation. Overall operation of the steering damper control apparatus is preferably the same as in the flow chart of FIG. 7 described above, and operation of the normal control calculation is preferably the same as in the flow chart of FIG. 8 described above. Thus, their detailed description is omitted here.

Steps S41-S43

The rotational frequency change rate calculating unit 91 receives rotational frequencies of the engine 7 from the engine rotational frequency sensor 37, calculates moving averages, and thereafter calculates a rotational frequency change rate based on differences between the moving averages and current rotational frequencies.

Steps S44-S46

The command value output unit 93 branches the process based on the absolute value of the rotational frequency change rate and the table used to calculate a damping force command value 93a. Specifically, the process is branched based on whether or not the absolute value of the rotational frequency change rate exceeds the first threshold value RD1. When the first threshold value RD1 is exceeded, a damping force command value is determined based on the absolute value of the rotational frequency change rate and the table used to calculate a damping force command value 93a. After turning the idle spin detection flag ON which indicates that an idle spin has been detected, the process returns to step S4 in FIG. 7.

Steps S47, S48

On the other hand, when the absolute value of the rotational frequency change rate does not exceed the first threshold value RD1, the command value output unit 93 determines whether the engine 7 is in an over-rotation state, and branches the process. Specifically, when it is determined to be in an over-rotation state, after setting the damping force command value to a maximum, the process moves to step S46. On the other hand, when it is determined not to be in an over-rotation state, the process returns to step S4 in FIG. 7.

According to the steering damper control apparatus in the present preferred embodiment, as in the first preferred embodiment described above, drive of the rear wheel 5 is prevented from deviating from a traveling direction, thus efficiently using the drive of the rear wheel 5 during traveling.

Based on the rotational frequencies of the engine 7 from the engine rotational frequency sensor 37, the rotational frequency change rate calculating unit 91 calculates a rotational frequency increase rate of the engine 7. When this rotational frequency increase rate is large, it indicates that the rear wheel 5 is in an idle spin. Thus, the command value output unit 93 determines an idle spin based on the rotational frequency increase rate.

The first threshold value RD1 is stored beforehand in the table used to calculate a damping force command value 93a to enable the command value output unit 93a to determine the occurrence of an idle spin based on this first threshold value RD1 and the rotational frequency increase rate. By setting the first threshold value RD1 appropriately, the timing of increasing the damping force of the MR damper 45 can be adjusted. Therefore, the controllability of the motorcycle 1 can be adjusted. Since the damping force of the MR damper 45 is increased according to the rotational frequency increase rate, the possibility of giving the rider an unnatural feeling is prevented or significantly reduced while preventing a posture change of the motorcycle 1.

Further, the second threshold value RD2 is stored beforehand in the table used to calculate a damping force command value 93a, and when the absolute value of the rotational frequency increase rate is equal to or higher than the second threshold value RD2, or when the command value output unit 93 detects an over-rotation state of the engine 7, the damper driver 77 increases the damping force of the MR damper 45 to a maximum. Therefore, by appropriately setting the second threshold value RD2, the timing of increasing the damping force of the MR damper 45 to a maximum can be adjusted, thus adjusting the controllability of the motorcycle 1. Even if the rotational frequency increase rate is less than the second threshold value RD2, the rotational frequency of the engine 7 becoming an over-rotation state may be accompanied by an idle spin of the rear wheel 5. So, when the command value output unit 91 detects an over-rotation of the engine 7, even if the rotational frequency increase rate is less than the second threshold value RD2, the damping force of the MR damper 45 is increased to a maximum, thus preventing a posture change of the motorcycle 1 due to the idle spin of the rear wheel 5 with high accuracy.

Next, a third preferred embodiment of the present invention will be described with reference to the drawings.

Figure 13:
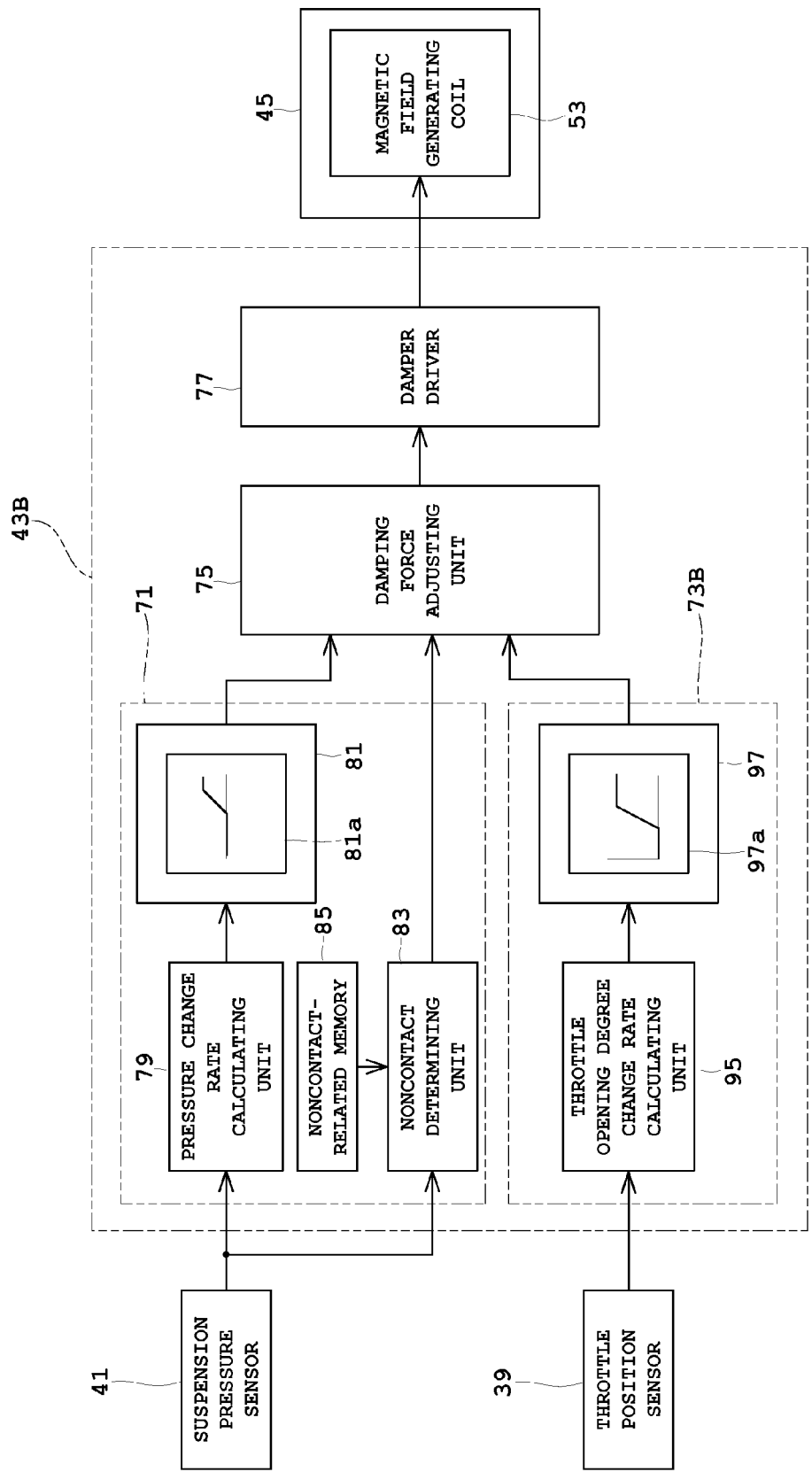
FIG. 13 is a block diagram showing an outline of a steering damper control apparatus according to a third preferred embodiment of the present invention.

FIG. 13 is a block diagram showing an outline of a steering damper control apparatus according to the third preferred embodiment. Like reference signs are affixed to like components which are preferably the same as in first preferred embodiment and will not particularly be described.

The controller 43B in the third preferred embodiment preferably includes the normal control unit 71, a posture change responsive control unit 73B, the damping force adjusting unit 75, and the damper driver 77. The posture change responsive control unit 73B is preferably different from that in the first preferred embodiment.

A throttle opening degree change rate calculating unit 95 of the posture change responsive control unit 73B calculates a change rate of a throttle opening degree based on outputs of the throttle position sensor 39. The calculated throttle opening degree change rate is provided to a command value output unit 97. The command value output unit 97 determines a damping force command value based on the absolute value of the throttle opening degree change rate and a table used to calculate a damping force command value 97a stored beforehand.

Figure 14:
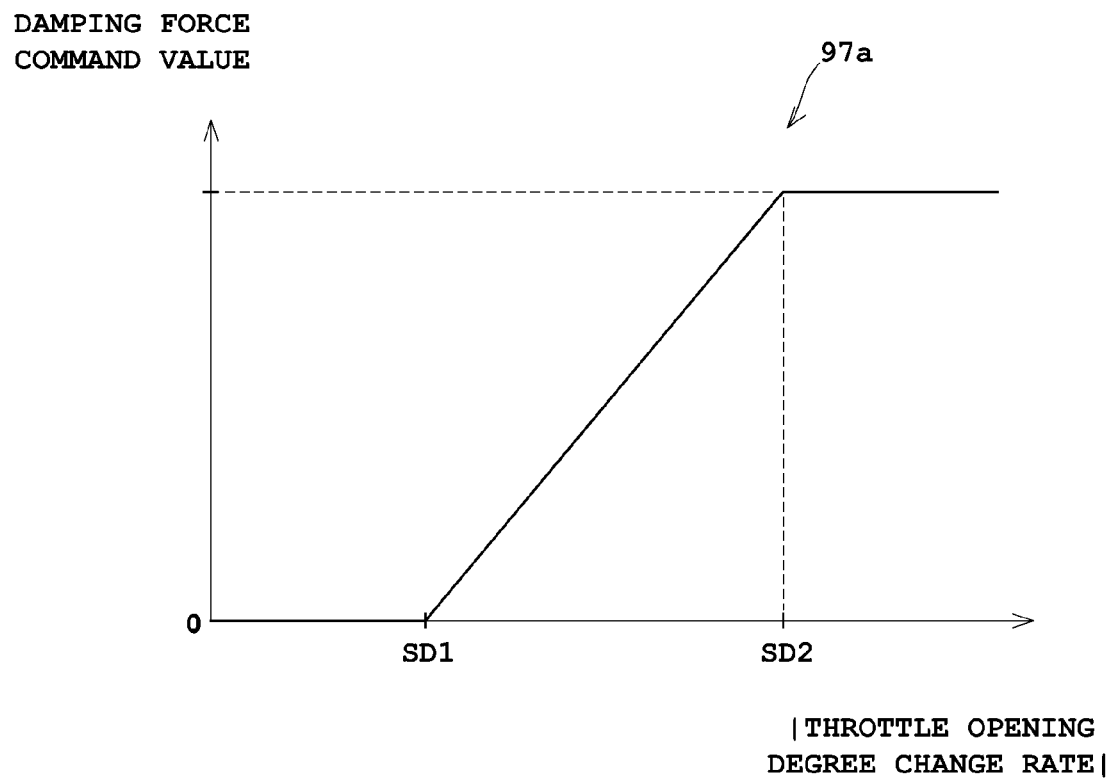
FIG. 14 is a view schematically showing a table used to calculate a damping force command value based on the absolute value of a throttle opening change rate.

Reference is now made to FIG. 14. FIG. 14 is a view schematically showing a table used to calculate a damping force command value based on the absolute value of the throttle opening degree change rate.

The "absolute value" of the throttle opening degree change rate is used as a criterion for judgment in order to cope with both acceleration (with the throttle opened) and deceleration (with the throttle closed) of the motorcycle 1. When the absolute value of the throttle opening degree change rate is zero, it indicates that the vehicle is traveling at a constant speed. When the absolute value of the throttle opening degree change rate reaches a certain amount, the engine 7 increases the rotational frequency rapidly, or conversely, decreases the rotational frequency rapidly. So it indicates that the grip of the rear wheel 5 has begun to be exceeded, which gives rise to a possibility of the rear wheel 5 starting a slight idle spin. When the absolute value of the throttle opening degree change rate becomes larger, it indicates a possibility of the rear wheel 5 starting a significant idle spin.

The table used to calculate a damping force command value 97a has been set beforehand as follows.

Up to a certain amount of the throttle opening degree change rate, even if the rear wheel 5 has started to spin idly, the rear wheel 5 will hardly causes a posture change to move to a large extent sideways about the head pipe 25. Therefore, the damping force command value is maintained at zero until the absolute value of the throttle opening degree change rate reaches the certain amount. When the absolute value of the throttle opening degree change rate becomes larger, the idle spin of the rear wheel 5 will exert a great influence on the posture change of the motorcycle 1. Specifically, there is a possibility that the rear wheel 5 moves to a great extent sideways such that the driving direction of the rear wheel 5 will begin to deviate greatly from the traveling direction. So, when the absolute value of the throttle opening degree change rate reaches a first threshold value SD1, the damping force command value is raised at a constant rate to a second threshold value SD2. Consequently, the damping force of the MR damper 45 is progressively increased with the possibility of an idle spin of the rear wheel 5. As a result, it prevents the rear wheel 5 from deviating to a large extent sideways. And when the absolute value of the throttle opening degree change rate reaches or exceeds the second threshold value SD2, the damping force command value is set to a maximum. In this manner, the command value output unit 97 outputs the damping force command value to the damping force adjusting unit 75 based on the absolute value of the throttle opening degree change rate provided from the throttle opening degree change rate calculating unit 95 and the above table used to calculate a damping force command value 97a.

The above throttle position sensor 39, throttle opening degree change rate calculating unit 95, and command value output unit 97 correspond to the "idle spin detecting device" in the present preferred embodiment. The throttle opening degree change rate calculating unit 95 corresponds to the "change rate calculating device" in the present preferred embodiment. The command value output unit 97 corresponds to the "presuming device" and the "storage device" in the present preferred embodiment. The first threshold value SD1 and second threshold value SD2 in the table used to calculate a damping force command value 97a noted above correspond to the "first threshold value" and the "second threshold value" in the present preferred embodiment.

Figure 15:
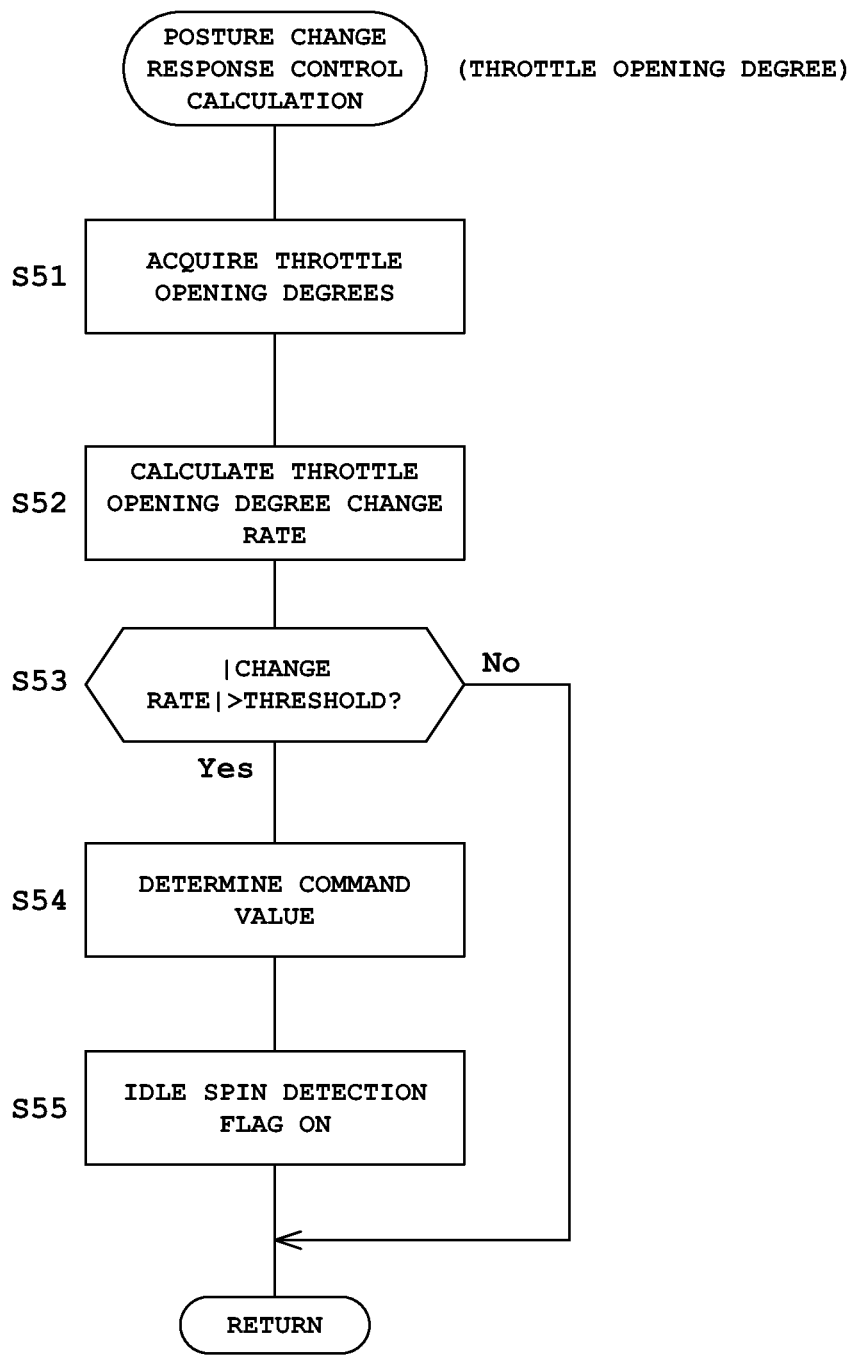
FIG. 15 is a flowchart showing a posture change responsive control calculation.

Operation of the steering damper control apparatus will be described with reference to FIG. 15. FIG. 15 is a flow chart showing operation of the posture change responsive control calculation. Overall operation of the steering damper control apparatus is preferably the same as in the flow chart of FIG. 7 described above, and operation of the normal control calculation is preferably the same as in the flow chart of FIG. 8 described above. Thus, their detailed description is omitted here.

Steps S51, S52

The throttle opening degree change rate calculating unit 95 receives signals from the throttle position sensor 39, and calculates a change rate.

Steps S53-S55

The command value output unit 93 branches the process based on the absolute value of the throttle opening degree change rate and the table used to calculate a damping force command value 97a. Specifically, the process is branched based on whether or not the absolute value of the throttle opening degree change rate exceeds the first threshold value SD1. When the absolute value of the throttle opening degree change rate exceeds the first threshold value SD1, a damping force command value is determined based on the absolute value of the throttle opening degree change rate and the table used to calculate a damping force command value 97a. After turning the idle spin detection flag ON which indicates that an idle spin has been detected, the process returns to step S4 in FIG. 7. When the absolute value of the throttle opening degree change rate does not exceed the first threshold value SD1, the process returns to step S4 in FIG. 7.

According to the steering damper control apparatus in the present preferred embodiment, as in the first and second preferred embodiments described above, the driving direction of the rear wheel 5 is prevented from deviating from a traveling direction, thus efficiently using the drive of the rear wheel 5 during traveling.

Based on the throttle opening degree from the throttle position sensor 39, the throttle opening degree change rate calculating unit 91 calculates a change rate thereof. When the throttle opening degree change rate is large, the probability of the rear wheel 5 going into an idle spin is extremely high. Thus, the command value output unit 97 presumes an idle spin of the rear wheel 5 based on the throttle opening degree change rate. Therefore, the damping force of the MR damper 45 is increased before the idle spin of the rear wheel 5 actually starts, thus promptly preventing a posture change of the motorcycle 1.

The first threshold value SD1 is stored beforehand in the table used to calculate a damping force command value 97a to enable the command value output unit 97 to presume the occurrence of an idle spin of the rear wheel 5 based on the first threshold value SD1 and the throttle opening degree change rate. By setting the first threshold value SD1 appropriately, the timing of increasing the damping force of the MR damper 45 can be adjusted. Therefore, the controllability of the motorcycle 1 can be adjusted. Since the damping force of the MR damper 45 is increased according to the throttle opening degree change rate, the possibility of providing the rider with an unnatural feeling is prevented while also preventing a posture change of the motorcycle 1.

Further, the second threshold value SD2 is stored beforehand in the table used to calculate a damping force command value 97a, and when the absolute value of the throttle opening degree change rate is equal to or higher than the second threshold value SD2, the command value output unit 97 increases the damping force of the MR damper 45 to a maximum. Therefore, by appropriately setting the second threshold value SD2, the timing of increasing the damping force of the MR damper 45 to a maximum can be adjusted. Consequently, the controllability of the motorcycle 1 can be adjusted.

The present invention is not limited to the foregoing preferred embodiments, but may be modified as described below.

Each of the first through third preferred embodiments described above preferably determines whether the front wheel 3 is out of contact with the ground, and when it is out of contact, reduces the damping force of the MR damper 45 to zero. However, the present invention does not necessarily need to have such construction, but may reduce the cost by omitting this feature.

Each of the first through third preferred embodiments described above preferably increases the damping force command value according to the difference in rotational frequency between the front and rear wheels, the rotational frequency increase rate, or the throttle opening degree change rate. However, the present invention is not limited to such a construction. For example, the damping force command value may be increased to a maximum at a point of time when the difference in rotational frequency between the front and rear wheels, the rotational frequency increase rate, or the throttle opening degree change rate exceeds a threshold value. This can simplify the control.

In each of the first through third preferred embodiments described above, the MR damper 45 is preferably used to adjust the damping force, but the present invention is not limited to this construction. For example, using a hydraulic damper to adjust an orifice diameter according to the damping force command value produces the same effects as the case of using the MR damper 45.

In each of the first through third preferred embodiments described above, the damping force of the MR damper 45 at normal times is made zero which is a minimum value. However, at normal times, the damping force of a certain amount may be used. This necessitates a steering force at normal times, but prevents wobbling of the steering bar 17 at times of straight traveling.

Each of the first through third preferred embodiments has been described with respect to a motorcycle 1 as an example of a saddle riding type vehicle. However, besides the motorcycle 1, the present invention is applicable to any vehicle with an engine in which people can ride in a straddling state, such as a three-wheeled motorcycle with two front wheels or two rear wheels, for example.

As described above, the present invention is suitable as a steering damper control apparatus provided for a steering mechanism of a vehicle to adjust a steering damping force, and a saddle riding type vehicle having the same.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A steering damper control apparatus to control a steering damping force, the steering damper control apparatus comprising:
    a damper having an adjustable steering damping force;
    an idle spin detecting device that detects an idle spin of a rear wheel; and
    a damping force adjusting device that adjusts the damping force of the damper to be higher when the idle spin detecting device detects an idle spin than the damping force of the damper when the rear wheel is not in an idle spin; wherein
    the idle spin detecting device includes:
        a front wheel rotational frequency detecting device that detects a rotational frequency of a front wheel;
        a rear wheel rotational frequency detecting device that detects a rotational frequency of the rear wheel;
        a difference calculating device that calculates a difference in rotational frequency between the front wheel and the rear wheel; and
        a distinguishing device that distinguishes an occurrence of an idle spin based on the difference;
    the distinguishing device includes a storage device that stores a first threshold value, and distinguishes an occurrence of an idle spin based on the difference having exceeded the first threshold value;
    the storage device includes, stored therein, a second threshold value larger than the first threshold value; and
    the damping force adjusting device increases the damping force to a maximum when the difference in rotational frequency between the front wheel and the rear wheel is equal to or larger than the second threshold value.

2. The steering damper control apparatus according to claim 1, wherein the damping force adjusting device increases the damping force according to the difference in rotational frequency between the front wheel and the rear wheel.

3. The steering damper control apparatus according to claim 1, further comprising:
    a pressure detecting device that detects a pressure of a suspension of the front wheel;
    a pressure lower limit storage device that stores a lower limit of the pressure therein; and
    a front wheel noncontact determining device that determines that the front wheel has changed from a ground-contacting state to a noncontact state when the pressure detected by the pressure detecting device is at the lower limit, and the pressure remains at the lower limit for a predetermined time; wherein
    the damping force adjusting device makes the damping force zero when the front wheel noncontact determining device determines that the front wheel is in the noncontact state.

4. A saddle riding type vehicle including the steering damper control apparatus according to claim 1.

5. A steering damper control apparatus to control a steering damping force, the steering damper control apparatus comprising:
    a damper having an adjustable steering damping force;
    an idle spin detecting device that detects an idle spin of a rear wheel; and
    a damping force adjusting device that adjusts the damping force of the damper to be higher when the idle spin detecting device detects an idle spin than the damping force of the damper when the rear wheel is not in an idle spin; wherein
    the idle spin detecting device includes:
        an engine rotational frequency detecting device that detects rotational frequencies of an engine;
        an increase rate calculating device that calculates a rotational frequency increase rate of the engine based on the rotational frequencies; and
        a distinguishing device that distinguishes an occurrence of an idle spin based on the rotational frequency increase rate.

6. A saddle riding type vehicle including the steering damper control apparatus according to claim 5.

7. The steering damper control apparatus according to claim 5, wherein the distinguishing device includes a storage device that stores a first threshold value stored therein, and distinguishes an occurrence of an idle spin based on the rotational frequency increase rate having exceeded the first threshold value.

8. The steering damper control apparatus according to claim 7, further comprising an over-rotation detecting device that detects an over-rotation state of the engine; wherein
    the storage device includes, stored therein, a second threshold value larger than the first threshold value; and
    the damping force adjusting device increases the damping force to a maximum when the rotational frequency increase rate is equal to or larger than the second threshold value, or when the over-rotation detecting device detects an over-rotation state of the engine.

9. The steering damper control apparatus according to claim 5, wherein the damping force adjusting device increases the damping force according to the rotational frequency increase rate.

10. The steering damper control apparatus according to claim 5, further comprising:
    a pressure detecting device that detects a pressure of a suspension of the front wheel;
    a pressure lower limit storage device that stores a lower limit of the pressure therein; and
    a front wheel noncontact determining device that determines that the front wheel has changed from a ground-contacting state to a noncontact state when the pressure detected by the pressure detecting device is at the lower limit, and the pressure remains at the lower limit for a predetermined time; wherein the damping force adjusting device makes the damping force zero when the front wheel noncontact determining device determines that the front wheel is in the noncontact state.

11. A steering damper control apparatus to control a steering damping force, the steering damper control apparatus comprising:
- a damper having an adjustable steering damping force;
- an idle spin detecting device that detects an idle spin of a rear wheel; and
- a damping force adjusting device that adjusts the damping force of the damper to be higher when the idle spin detecting device detects an idle spin than the damping force of the damper when the rear wheel is not an idle spin; wherein
- the idle spin detecting device includes:
  - a throttle position sensor that detects a throttle opening degree;
  - a change rate calculating device that calculates a change rate of the throttle opening degree; and
  - a presuming device that presumes an occurrence of an idle spin based on the change rate.

12. The steering damper control apparatus according to claim 11, wherein the presuming device includes a storage device that stores a first threshold value therein, and presumes occurrence of an idle spin based on the change rate having exceeded the first threshold value.

13. The steering damper control apparatus according to claim 12, wherein the storage device includes, stored therein, a second threshold value larger than the first threshold value; and
- the damping force adjusting device increases the damping force to a maximum when the change rate is equal to or larger than the second threshold value.

14. The steering damper control apparatus according to claim 11, wherein the damping force adjusting device increases the damping force according to the change rate.

15. The steering damper control apparatus according to claim 11, further comprising:
- a pressure detecting device that detects a pressure of a suspension of the front wheel;
- a pressure lower limit storage device that stores a lower limit of the pressure therein; and
- a front wheel noncontact determining device that determines that the front wheel has changed from a ground-contacting state to a noncontact state when the pressure detected by the pressure detecting device is at the lower limit, and the pressure remains at the lower limit for a predetermined time; when
- the damping force adjusting device makes the damping force zero when the front wheel noncontact determining device determines that the front wheel is in the noncontact state.

16. A saddle riding type vehicle including the steering damper control apparatus according to claim 11.

* * * * *